US007136788B2

(12) United States Patent
Tupper

(10) Patent No.: US 7,136,788 B2
(45) Date of Patent: Nov. 14, 2006

(54) OPTIMIZED PARAMETRIC MODELING SYSTEM AND METHOD

(75) Inventor: Joseph L. Tupper, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 939 days.

(21) Appl. No.: 10/271,965

(22) Filed: Oct. 15, 2002

(65) Prior Publication Data

US 2004/0073475 A1   Apr. 15, 2004

(51) Int. Cl.
G06F 17/10    (2006.01)
(52) U.S. Cl. ......................................................... 703/2
(58) Field of Classification Search .................... 703/2; 706/21; 707/101; 700/29
See application file for complete search history.

(56) References Cited

U.S. PATENT DOCUMENTS 6,190,857 B1 *  2/2001  Ralph et al. ................... 435/4
6,560,541 B1 *  5/2003  Singh ........................... 702/19
6,810,368 B1 * 10/2004  Pednault ........................ 703/2
6,867,051 B1 *  3/2005  Anderson et al. ........... 436/518

* cited by examiner

Primary Examiner—Albert W. Paladini
(74) Attorney, Agent, or Firm—Harness Dickey & Pierce P.L.C.

(57) ABSTRACT

A system for enabling optimization of a parametric modeling process. The system includes a processor and an interface that allows at least one user input. Additionally, the system includes a regression analysis tree program that is executable by the processor. Upon execution by the processor, the regression analysis tree program operates to build a tree in accordance with the at least one user input by using a modified forward stepwise regression process to select the attributes for the tree's branches from a plurality of attributes. After the tree is built, the regression analysis tree program then performs regression analysis to calculate at least one regression result for an attribute subset in a tree branch when the tree branch is in compliance with at least one criterion and the attribute subset has not been previously analyzed.

31 Claims, 17 Drawing Sheets

SELECT SPECIAL FIELDS

RUNNUMBER: 1

SOURCE TABLE: QRYATTRIBUTES

CHECK TO INCLUDE FIELDS IN CORRELATIONS

PART NUMBER: PART NUMBER
PRICE: ✱ PRICE
QUANTITY: ✱ QUANTITY
WEIGHT: ✱ WEIGHT
SUPPLIER: SUPPLIER

SET SELECTED FIELDS USING THIS PANE. ALSO SET [PARTNUMBER] FIELD FOR ALL TABLES.

FIELDS IN THIS TABLE:
PART NUMBER
PRICE
QUANTITY
WEIGHT
QUANTITY PER SHIPSET
HEAVY DUTY TITANIUM PARTS
TOTAL LENGTH OF PART NUMBER
TOTAL WIDTH OF PART NUMBER

RECORD: 1 OF 4 (FILTERED)

OPTIMIZED PARAMETRIC MODELING SYSTEM AND METHOD

COPYRIGHT NOTICE

A portion of the disclosure of this document contains material that is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

FIELD OF THE INVENTION

The present invention relates generally to parametric modeling processes and more particularly to the development and evaluation of parametric price-prediction models.

BACKGROUND OF THE INVENTION

Parametric models (regression formulas) are often relied upon by parts purchasers and/or suppliers during negotiations to predict prices based on observed prices and part attributes. Indeed, the value of parametric price-prediction models has become so recognized that both purchasers and suppliers are now developing parametric price-prediction modeling processes for use during future negotiations.

Although other predicted price formulas are possible, predicted prices are generally a linear function of the objective part attributes. Some of the various part attributes that may be considered include physical characteristics (e.g., material, length, weight, etc.), functional characteristics (e.g., passenger door versus landing gear door, etc.), among numerous other attribute possibilities. In addition, attributes that are functions of other attributes (e.g., Area=Width*Length) may also be used in a parametric price-prediction model. Determining which attributes to collect and calculate when constructing a model is a very complex and complicated task for the modeler and others involved in the parametric modeling process.

In addition to the attributes that tend to determine costs, purchased parts also reflect the competitive pressures of a free market economy. Thus, another goal in the development of a parametric pricing model is to simulate a competitive marketplace and use this simulation to compare or rank suppliers.

Data complexity for parts and part assemblies continues to increase. Indeed, it is not uncommon for part assemblies to require consideration of about one-thousand (1,000) attributes. Due to the complexity of the data associated with such part assemblies, a substantial amount of time is needed for developing and evaluating the more challenging parametric price modeling of part assemblies.

Meanwhile, and despite the increasing data complexity associated with both parts and part assemblies, staff and modeling time available for parametric price modeling has decreased. Moreover, re-pricing parts over time also requires new models based on updated data, which only further adds to the disparity between the modeling effort required and the limited amount of available staff and modeling time.

Developing candidate models with existing known methods and tools typically requires at least about one-half (0.50) hour per candidate model. Even with 20 to 50 attributes in the data, modelers will construct and manually evaluate hundreds of candidate models. Understandably then, developing price-prediction models for datasets including hundreds of attributes, which can generate many hundreds or even thousands of candidate models, can be especially time consuming. Moreover, after expending the time and resources to develop a candidate model, the candidate model may ultimately be rejected because it fails simple reasonability tests (e.g., too high a correlation between two attributes, an unreasonably large number of negative predicted prices, etc.) applied after the model has been constructed. In the past, this review has been done through manual review by modelers.

In addition, a predominantly manual selection process may overlook a good candidate model because tracking model development is difficult with existing tools and resources. In addition, models must be reconstructed when data changes because data changes can render interim modeling and price prediction results useless. As a result of such data changes, a substantial amount of time is currently spent on updating and revalidating parametric pricing models to retain full credibility.

Computerized statistical analysis tools do exist, such as Statistica® statistical analysis software available from Statistica, Inc. Corporation of Gaithersburg, Md. and JMP® statistical analysis software available from SAS Institute Inc. Corporation of Cary, N.C. However, the existing computerized tools are manually driven, require significant user interaction, and produce one candidate model at a time such that the regressions are considered in isolation and reviewed individually by the modeler. Although the existing computerized statistical analysis tools allow for construction of models without writing software, the existing tools do not keep track of candidate models well and require each model to be constructed under significant human control. Accordingly, the current approach to developing and testing candidate models is time consuming especially when hundreds of candidate models must be tested or retested as data changes. Moreover, the current approach is not possible when thousands or even hundreds of thousands of candidate models must be tested or retested.

SUMMARY OF THE INVENTION

Accordingly, a need remains for a system and method that reduces the cycle development time for parametric models. Ideally, such a system should allow efficient model updating in response to data changes and permit extensively documented and organized modeling activities for complex statements of work in which hundreds of attributes are common.

In one form, the present invention provides a system for enabling optimization of a parametric modeling process. The system includes a processor and an interface that allows a user to readily specify various input parameters that will be used by the system. Additionally, the system includes a regression analysis tree program that is executable by the processor. Upon execution by the processor, the regression analysis tree program operates to build a tree in accordance with the at least one user input by using a modified forward stepwise regression process to select the attributes for the tree's branches from a plurality of attributes. After the tree is built, the regression analysis tree program then performs regression analysis to calculate at least one regression result for an attribute subset in a tree branch when the tree branch is in compliance with at least one criterion and the attribute subset has not been previously analyzed. Accordingly, the present invention optimizes and substantially improves several aspects of the parametric modeling process including model development, model reliability, model updating after attribute data changes, model testing, model reporting, and model comparison.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein:

FIG. 10 is a an illustration of a Select Special Fields panel that may be after the Set Special Fields button has been selected;

FIG. 11 is an illustration of the Tree Controls panel that may be displayed after the Tree Controls tab has been selected;

FIG. 12 is an illustration of the Skip Attributes panel that may be displayed after the Skip Attributes tab has been selected;

FIG. 13 is an illustration of a Run Progress dialog box that may be displayed after the Run button has been activated;

FIG. 14 is another illustration of the Run Progress dialog box shown in FIG. 13;

FIG. 15 is an illustration of the Select Results panel that may be displayed after the Select Results tab has been selected; and FIG. 16 is an illustration of the View Results panel that may be displayed after the user has finished entering data into the Select Results panel shown in FIG. 15.

Corresponding reference characters indicate corresponding features throughout the drawings.

DETAILED DESCRIPTION OF THE PREFERRED EMBODIMENTS

Figure 1:
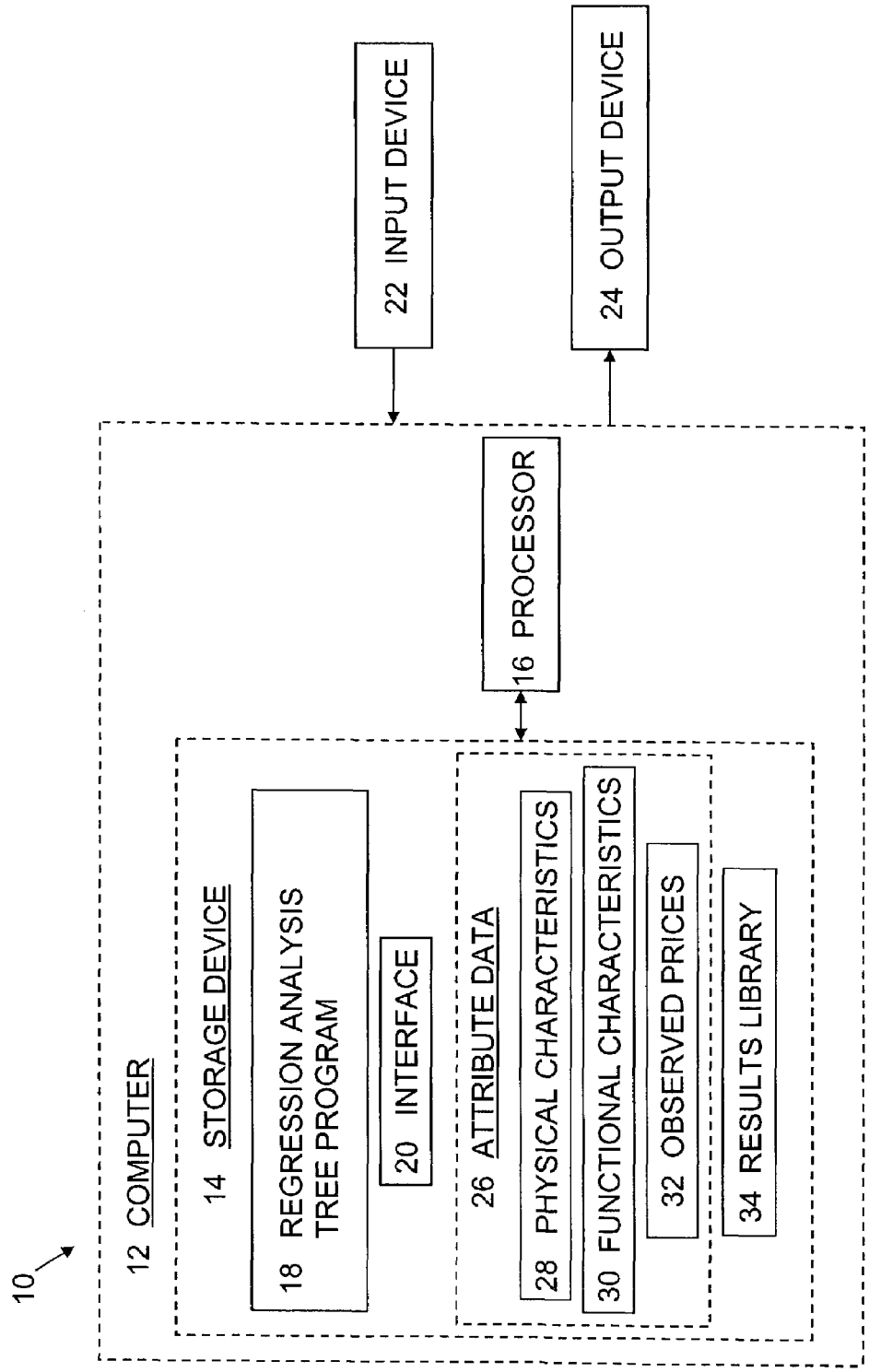
FIG. 1 is a schematic of a preferred embodiment of a system allowing for an optimized parametric modeling process in accordance with the principles of the present invention.

Referring to FIG. 1, there is shown a control system, generally indicated by reference number 10, according to one preferred embodiment of the present invention. Generally, the system 10 enables the implementation of an optimized parametric modeling process through control and automation. As described in greater detail below, the system 10 filters out certain attributes from a plurality of attributes and then builds a tree of regression formulas by using a modified forward stepwise regression process. The system 10 also selects and produces regression results for the untested attribute subsets of the tree branches which meet certain criteria. The system 10 further includes a query and reporting facility for filtering, selecting, ranking, and sorting the regression results, which in turn allows the regression results to be outputted, evaluated and compared against each other in an efficient and organized manner. Accordingly, the invention optimizes and substantially improves several aspects of the parametric modeling process including model development, model reliability, model updating after attribute data changes, model testing, model evaluation, and model comparison.

As shown in FIG. 1, the system 10 includes a computer 12, which may comprise any of a wide range of computers now known in the art or that may be developed in the future. By way of example only, the computer 12 may comprise a desktop or laptop personal computer.

The computer 12 preferably includes a storage device 14 and a processor 16 suitable for executing the functions of the computer 12. The processing unit or processor 16 may comprise any of a wide range of suitable processors as would be obvious to persons having ordinary skill in the art after having become familiar with the teachings of the present invention. For example, the processing unit 16 may comprise an Intel® Pentium® processor, although other processors may also be used.

The storage device 14 may comprise computer readable media for storing such items as program code, software packages, programs, algorithms, information, data, files, databases, applications, among other things. For example, the storage device 14 may comprise one or more computer readable storage media on which is stored a regression analysis tree subroutine or program 18, program code for implementing an interface 20, attribute data 26, and/or a results library 34. The storage device 14 can be any suitable computer readable storage device, such as read only memory (ROM), random access memory (RAM), video memory (VRAM), hard disk, floppy diskette, compact disc (CD), magnetic tape, a combination thereof, etc.

In the illustrated embodiment, the system 10 includes a single processor 16 and a single storage device 14. However, it is to be understood there can be any number of (i.e., one or more) processors 16 and/or any number of storage devices 14 that are connected or linked via a local area network (LAN), a wide area network (WAN), a secure network, an Intranet, the Internet, etc. In such a scenario, the storage of computer readable program code may be distributed over the various storage devices 14 and/or executed in parts by the various processors 16.

The system 10 further includes an input device 22 (e.g., a mouse, keyboard, other computer pointing devices, among others) that allows a user to input information, data, queries, etc. into the computer 12. The system 10 also includes an output component 24 (e.g., graphical display, printer, among others) for displaying or outputting such things as information and data whether textually or graphically. The interface 20 and the input and output components 22 and 24 allow the user to interact with the system 10. In other embodiments, any number of suitable peripheral devices (e.g., monitor, printer, keyboard, mouse, etc.) may be connected to the system 10 either directly or indirectly.

The system 10 further comprises the attribute data 26 that may be collected and/or calculated by a modeler. As described in detail below, the attribute data 26 is used by the system 10 when constructing the tree of regression formulas (e.g., exemplary tree 120 shown in FIG. 3). Data pertaining to any of a wide range of attributes may be contained within the attribute data 26. For example, the attribute data 26 may include data pertaining to the parts' physical characteristics 28 (e.g., material, length, weight, etc.), functional characteristics 30 (e.g., passenger door versus landing gear door, etc.), observed prices 32, among other attributes.

The attribute data 26 may comprise a table, database, or matrix such as in a Microsoft® Visual Basic for Applications (VBA) environment or other programming environment. As shown, the attribute data 26 resides within the storage device 14. However, the attribute data 26 may instead be stored elsewhere, such as a network device or a network site of a network to which the system 10 is connected.

The system 10 further includes the regression analysis tree subroutine or algorithm 18 and the program code implementing the interface 20, both of which are executable by the processor 16 and described in greater detail below. The regression analysis tree program 18 and interface 20 may be embodied in computer readable program code stored in one or more computer readable storage media operatively associated with the system 10. For example, the computer readable program code comprising the regression analysis tree program 18 and/or the interface 20 may be stored in one or more computer readable storage media residing at, or associated with, the storage device 14. Alternatively, the computer readable program code comprising the regression analysis tree program 18 and/or the interface 20 may be stored elsewhere, such as a network device or a network site of a network to which the system 10 is connected.

It is to be understood that the computer readable program code described herein can be conventionally programmed using any of a wide range of suitable computer readable programming languages that are now known in the art or that may be developed in the future. Preferably, the computer readable programming language comprising the regression analysis tree program 18 and the interface 20 is a cross-platform compatible computer language.

It is also to be understood that the computer readable program code described herein can include one or more functions, routines, subfunctions, and subroutines, and need not be combined in a single package but may instead be embodied in separate components. In addition, the computer readable program code may be a stand-alone application, or may be a plug-in module for an existing application and/or operating system. Alternatively, the computer readable program code may be integrated into an application or operating system. In yet another embodiment, the computer readable program code may reside at one or more network devices (not shown), such as an administrator terminal, a server, etc.

In the preferred embodiment, the execution of the interface software package 20 by the processor 16 provides the user with a series of interactive screens (e.g., panels and dialog boxes shown in FIGS. 7 through 16) that are graphically displayed via the output component 24 (FIG. 1). As described in greater detail below, the interactive screens allow at least one user input for the parametric modeling process. For example, the interactive screens may allow the user to define the data source for the attribute data 26, to set tree controls, to manually designate certain parts and/or part attributes that will be suppressed and thus not used during the execution of the regression analysis tree program 18, among other things.

Although the present invention is described with the regression analysis tree program 18 and the interface 20 having a direct effect on and direct control of the system 10, it should be understood that it is the instructions generated by the execution of the programs 18 and 20 by the processor 16, and the subsequent implementation of such instructions by the processor 16, that have direct effect on and direct control of the system 10.

Figure 2A:
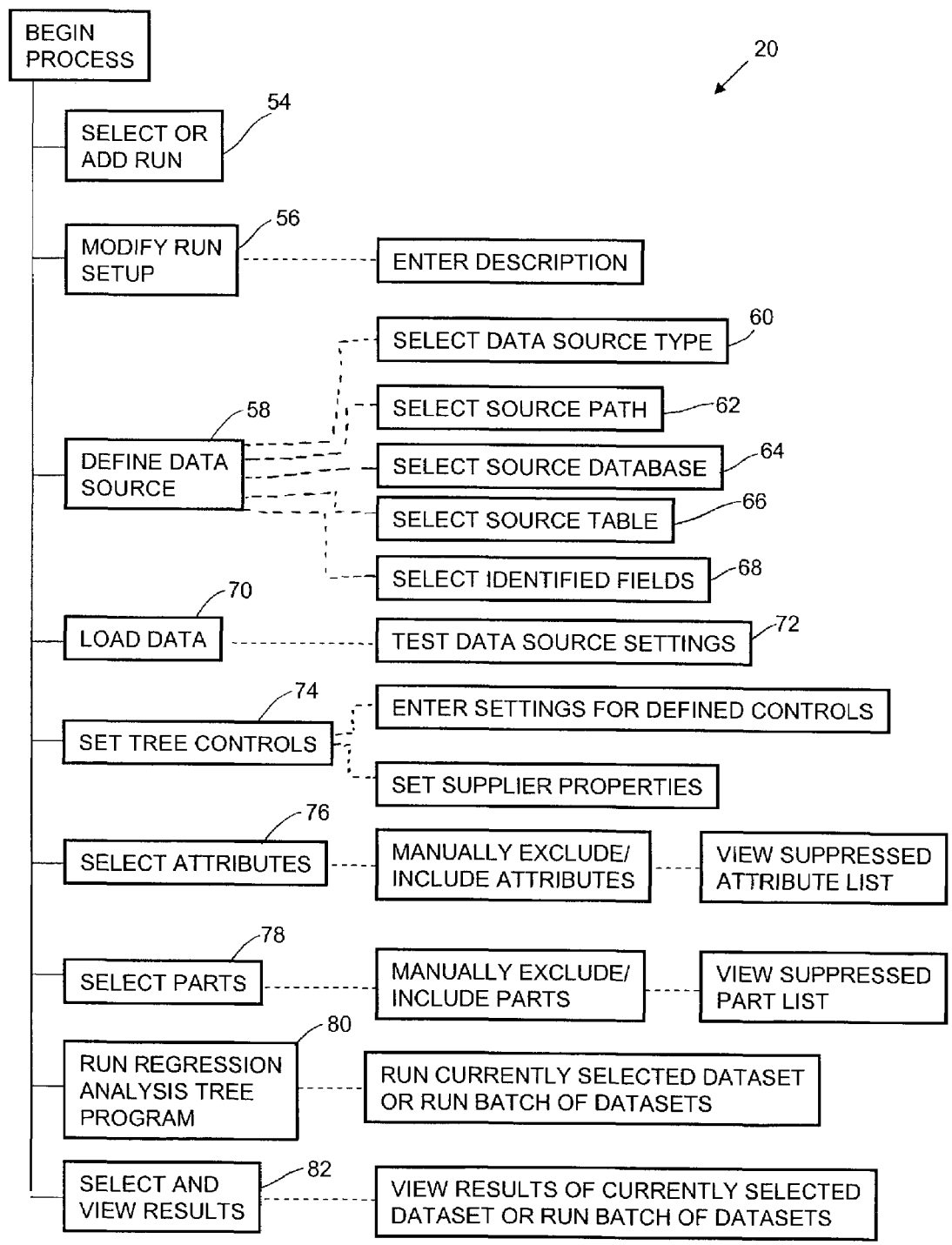
FIGS. 2A and 2B form a functional block diagram of the interface shown in FIG. 1.
Figure 2B:
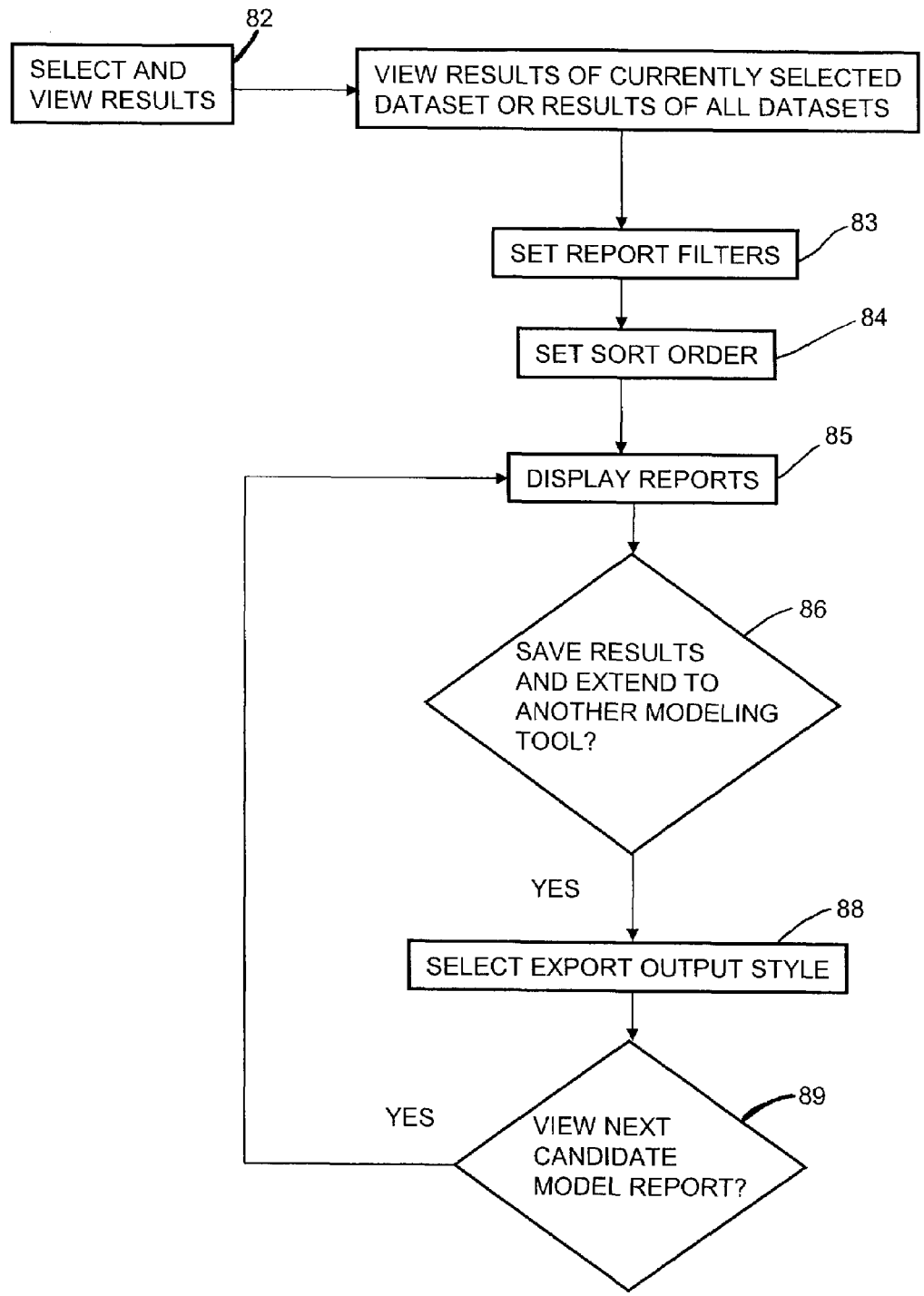

The interface 20 of the present invention will now be discussed in greater detail. A functional block diagram of the interface 20 is shown in FIGS. 2A and 2B, which outline a number of the salient features and operations of the interface 20. Generally, the interface 20 allows at least one user input and provides the at least one user input to the system 10 for use during the execution of the regression analysis tree program 18. Accordingly, the interface 20 provides the user with at least some control in during the optimized parametric modeling process.

According to one preferred embodiment, the interface 20 guides or leads the user through a series of input steps or operations. It should be noted, however, that a user need not necessarily enter the input parameters in the order that is shown in FIG. 2 or described below. That is, the order of the operations shown in FIG. 2 is for descriptive purposes only and should not be construed as limiting the scope of the present invention.

As shown in FIG. 2A, operation 54 of the interface 20 allows the user or modeler to select either a previously performed run or select a new run. At operation 56, the interface 20 allows the user to modify the run setup, for example, by entering a description for the new run that is going to be performed. In another operation 58, the interface 20 allows the user to define the data source in which the attribute data 26 is located. For example, the interface 20 may allow the user to designate the following information for the attribute data 26: the data source type 60 (e.g., general database source, a Microsoft® MS Access Database table, a JMP® Database table, among other data source types), the source path 62, the source database 64, the source table 66, and/or identified fields 68 (e.g., part number, price, supplier, quantity, weight, etc.).

The interface 20 may additionally or alternately include one or more links to database tables. After clicking on a particular link, the corresponding database table would then be imported thus allowing the attribute data contained within the imported database table to be used during the execution of the regression analysis tree program 18.

At operation 70, the interface 20 accesses the attribute data 26 so that the attribute data 26 can be displayed to user at operation 76, described below. Loading the attribute data 26 also allows for the testing (operation 72) of the data source settings (e.g., data source type 60, source path 62, source database 64, source table 66, identified fields 68) entered by the user at operation 58. If the attribute data 26 is loaded properly, the interface 20 moves onward to operation 74. However, if the system 10 is unable to load the attribute data 26, the user may be provided with an indication as to this condition (e.g., user interactively prompted to enter parameter value, error message provided and program halted, etc.) and be allowed to make changes to the information defining the data source which was previously entered during operation 58.

At operation 74, the interface 20 allows for the designation of tree controls to provide the user with at least some control over the manner in which the tree of regression formulas will be constructed by the regression analysis tree program 18. For example, the user may enter settings for defined controls on the tree such as limits on the number of levels or depth of the tree and/or limits on the number of nodes or attribute choices made at each tree level. The limits on the number of nodes at each tree level may vary by tree level such that each tree level need not be limited to same number of nodes. For example, the use may enter a "4.3.2" pattern which allows four (4) attribute choices for the first tree level, three (3) attribute choices for the second tree level, and two (2) attribute choices for each subsequent tree level.

Other settings that the user can also enter at operation 74 include allowable correlation between attributes, sparse fill level (minimum non-modal values), minimum $R^2$ (coefficient of multiple determination), stacking threshold, outlier level, maximum Predicted to Actual ratio, among other settings.

During operation 74, the user can also set one or more supplier properties which may be used later for determining which suppliers are deemed "Best in Class" (BIC). For example, the user may provide information as to qualitative characteristics determined outside the modeling process such as quality, timeliness, financial condition and number of distinct parts supplied.

After the attribute data 26 has been loaded or imported at operation 74, operation 76 allows the user to designate one or more attributes for inclusion within or exclusion from the parametric modeling process. For example, the interface 20 allows the user to manually designate one or more part attributes to ensure that those selected part attributes are suppressed or excluded from the parametric pricing models developed by the system 10. Similarly, the interface 20 also allows the user to designate certain parts at operation 78 for inclusion or exclusion in the optimized parametric modeling process. Preferably, the interface 20 displays the user's choices so that the user may review the choices for accuracy before initiating (operation 80) the execution of regression analysis tree program 18.

Figure 4:
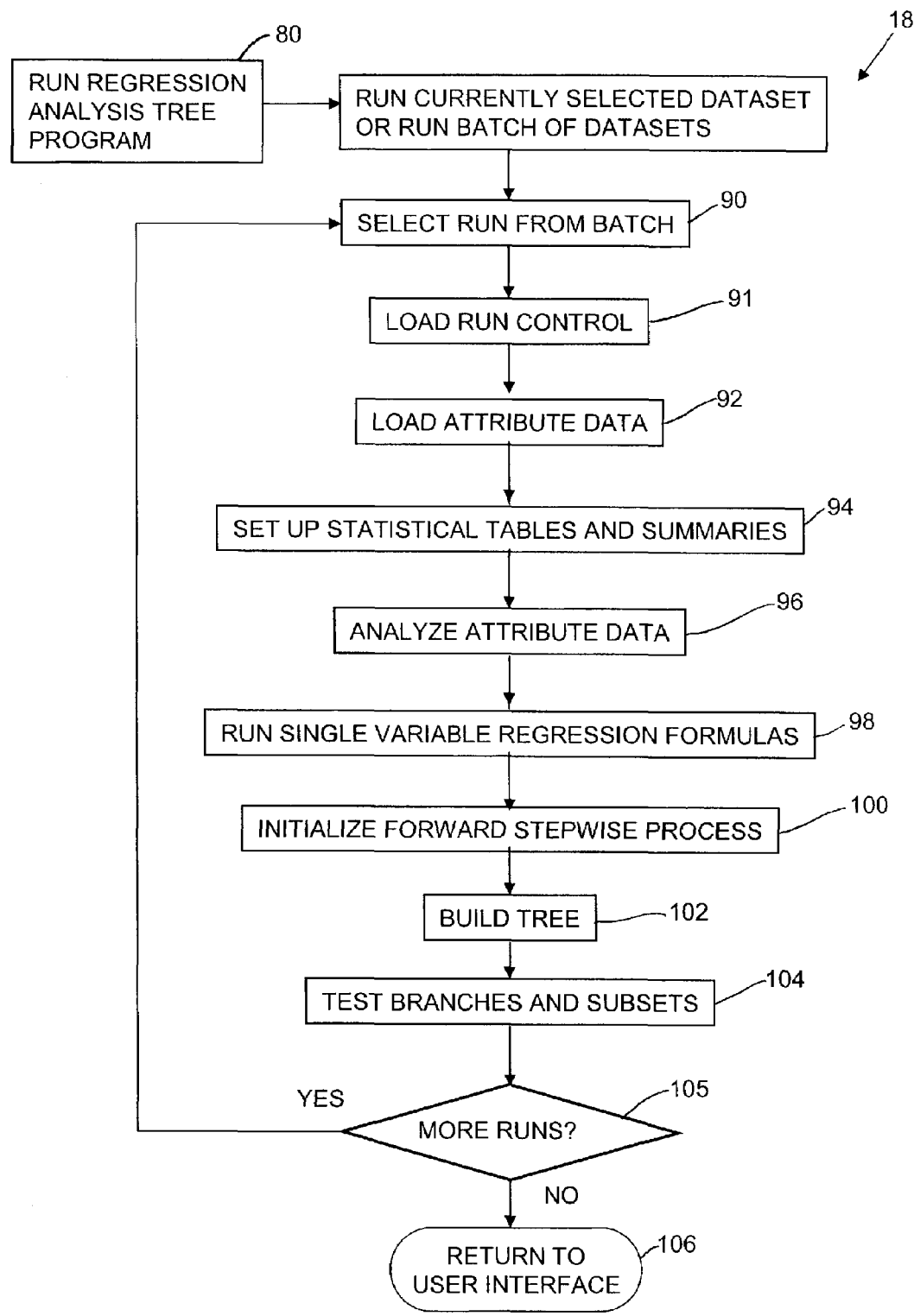
FIG. 4 is a functional block diagram of the regression analysis tree program shown in FIG. 1.

At operation 80, the user initiates the running or execution of the regression analysis tree program 18 by the processor 16. The system 10 preferably supports batch runs such that the regression analysis tree program 18 can process trees for different datasets. Accordingly, the interface 20 also allows the user to select whether the regression analysis tree program 18 will process a currently selected dataset or a batch of datasets. The various operations that may be performed by the regression analysis tree program 18 are shown in FIG. 4 and described in detail below.

Referring now to FIG. 2B, the interface 20 at operation 82 allows the user to select and view the results produced by the regression analysis tree program 18 for either a currently selected dataset or for all datasets. The interface 20 includes a query and reporting facility for filtering, selecting, ranking, and sorting the regression results and thus allows the regression results to be outputted, evaluated and compared against each other in an efficient and organized manner. In the illustrated embodiment, the interface 20 allows the user to set report filters at operation 83 for filtering and thus selecting which of the regression results will be outputted to the user. When setting the report filters, the user may set values for selection criteria such as:

Minimum adjusted $R^2$;

Maximum stacking index;

Maximum number of outliers;

Maximum number of negative predicted values;

Whether to ignore outliers or not in counting negative predicted values;

Minimum acceptable student's t-statistic in an attribute coefficient (ignoring the intercept);

Maximum allowable Predicted to Actual (or Actual to Predicted) ratio for all parts considered, for parts excluding outliers, or for parts including up to the $90^{th}$ percentile (or other level set by the modeler); and/or The maximum number of negative coefficients (ignoring the intercept).

The results, if any, that are in compliance with the selection criteria are preferably sorted in an order according to one of several choices or their appearance in the tree. In the illustrated embodiment, operation 84 of the interface 20 allows the user to set the sort order in which the filtered report(s) will be outputted or displayed to the user. The sort order may be selected from a number of choices such as:

Minimum adjusted $R^2$;

Stacking Index;

Number of outliers;

Number of negative predicted values;

Minimum t-value;

Maximum Actual to Predicted ratio;

Number of negative coefficients;

Number of attributes; and/or

An objection function to maximize such as Money on the Table (MOTT).

Briefly, MOTT is a measure of potential price savings for a given Statement of Work. At its simplest, MOTT is the sum of all parts considered in a model of the quantity of part purchased multiplied by the positive excess of actual price over predicted price (zero if the actual price is less than the predicted price). MOTT can be calculated as follows:

$$MOTT = \sum_{P > P_{hat}} (P - P_{hat}) * Q = \sum_{P} \text{Maximum } (P - P_{hat}, 0) * Q$$

where Q is the anticipated quantity of the part with price P, and the sum is over parts with a price (P) in excess of the predicted price ($P_{hat}$). The specifics of an actual MOTT formula may vary by supplier or other consideration. Other formulas are possible. One category of such formulas may be thought of as "More Money On The Table" (MMOTT) which first calculates the ratio, B, of the extended actual price to the extended actual predicted price for the Best in Class supplier (as defined by a business case analysis) and then restates the sum as follows:

$$MMOTT = \sum_{P} \text{Maximum } (P - B * P_{hat}, 0) * Q$$

The Maximum Actual to Predicted ratio is the maximum of all ratios $P/P_{hat}$ and $P_{hat}/P$ (P and $P_{hat}$ non-zero) taken over each part in the statement of work. Variations on this calculation may include omitting Outliers from the calculation or selecting a pre-set percentile as input by the modeler. This measure may be helpful in identifying models which work well over the full range of actual and predicted prices in the model.

The stacking index is an indicator of the amount of variation between the predicted prices for different parts. Ideally, the formula should provide a different predicted price for each different part. The stacking index varies between zero to one-hundred percent (100%). A stacking index of one-hundred percent (100%) indicates that the model predicts the same price for every part. Such a model might be considered unreasonable as not being smart enough to address the manner in which prices ought to vary for variations in the parts. A stacking index of zero (0) indicates that the model predicts a different price for each different part.

The following is an example showing the manner in which the stacking index is calculated. It should be noted, however, that the following example is for illustration purposes only and should not be construed as limiting the invention. In this example, the following parts, actual prices, and predicted prices are used as follows:

| PARTS | ACTUAL PRICE | PREDICTED PRICE |
|---|---|---|
| AA | 10 | 12 |
| BB | 12 | 15 |
| CC | 12 | 15 |
| DD | 13 | 15 |
| EE | 15 | 13 |
| FF | 15 | 13 |
| GG | 15 | 17 |
| HH | 20 | 17 |
| II | 20 | 18 |
| JJ | 20 | 18 |

To calculate the stacking index, a threshold value or bound is set. The bound determines when two prices will be considered the same for the stacking index calculations. Preferably, the bound is a user controlled or input value, although such is not required. For simplicity, the bound in the present example has been set at zero such that two prices must be identical to be treated the same.

Continuing with the example, a symmetric matrix is created with the parts and their predicted prices comprising the rows and the columns as shown in the matrix below. The cells of the upper half of symmetric matrix are filled in with either zeroes or ones with the matrix diagonal being ignored as well as the lower half which is the transpose of the upper half. When filling in the matrix cells, a one is placed into a cell when the predicted prices for the two parts corresponding with the cell are treated as the same (i.e., if the absolute value of the difference between the predicted prices is less than the bound). Otherwise, a zero is placed into the cell.

| PART | | AA | BB | CC | DD | EE | FF | GG | HH | II | JJ |
|---|---|---|---|---|---|---|---|---|---|---|---|
| | PREDICTED PRICE (P1 = P2?) | 12 | 15 | 15 | 15 | 13 | 13 | 17 | 17 | 18 | 18 |
| AA | 12 | | 0 | 0 | 0 | 0 | 0 | 0 | 0 | 0 | 0 |
| BB | 15 | | | 1 | 1 | 0 | 0 | 0 | 0 | 0 | 0 |
| CC | 15 | | | | 1 | 0 | 0 | 0 | 0 | 0 | 0 |
| DD | 15 | | | | | 0 | 0 | 0 | 0 | 0 | 0 |
| EE | 13 | | | | | | 1 | 0 | 0 | 0 | 0 |
| FF | 13 | | | | | | | 0 | 0 | 0 | 0 |
| GG | 17 | | | | | | | | 1 | 0 | 0 |
| HH | 17 | | | | | | | | | 0 | 0 |
| II | 18 | | | | | | | | | | 1 |
| JJ | 18 | | | | | | | | | | |

The ones within the matrix cells are then added to obtain a sum, which in the present example is six (6). The number of matrix cells in which has been inserted either a zero or a one is counted, which in the present example is forty-five (45) cells. The cells comprising the matrix diagonal and those cells below the diagonal are not counted. Finally, the stacking index is calculated by dividing the sum by the number of matrix cells counted, which for the present example is 6/45=13.33%.

It should be noted that other values (e.g., percentages, dollar values, etc.) might be used for the bound than what was used in the preceding example. In such embodiments, two predicted prices, P1 and P2, would be considered stacked even though not identical if the absolute value of the difference between P1 and P2 is less than the bound. For example, the bound or threshold may be set at two percent (2%) such that |P1−P2| is compared with 0.02*P1. Accordingly, P1 and P2 are treated as different prices and a zero is entered into the corresponding cell when |P1−P2|>0.02*P1. The value "0.02*P1" can be referred to as the comparison tolerance, and P1 can be referred to as the comparison base. Note that the matrix set forth above may not be symmetric when the comparison tolerance is not symmetric.

Alternatively, other choices can be used instead of P1 for the comparison base. Such other choices include, but are not limited to, min(P1,P2) (i.e., the minimum value of P1 and P2), max(P1,P2) (i.e., the maximum value of P1 and P2), mean (P1,P2) (i.e., (P1+P2)/2), and P2. In addition, the comparison base may also include a family of choices such as A*min(P1,P2)+B*max(P1,P2)+C*P1+D* P2 with A+B+C+D=1. Choosing a symmetric form from among a family of bases for the comparison tolerance may eliminate the possible lack of symmetry that might otherwise occur with the stacking index. For example, the price $98.02 is less than 2% lower than the price $100, however, $100 is more than 2% higher than $98.02. Symmetric forms are readily obtained with C=D in this exemplary family.

At operation 85 of the interface 20, the regression results are displayed via the output component 24 (FIG. 1) according to the report filter and sort order specified by the user at operations 83 and 84 (FIG. 2). The sort direction (ascending or descending) in which the results are displayed at operation 85 preferably varies with the sort order. For example, results sorted by adjusted $R^2$ or MOTT are preferably displayed in a decreasing order (i.e., from highest to lowest) because a higher adjusted $R^2$ and MOTT (which is indicative or more negotiating room) are usually preferred. Results sorted by the number of negative coefficients or number of attributes are preferably displayed in an increasing order (i.e., from lowest to highest) because an explanation with fewer variables is generally preferred and negative coefficients are generally harder to explain or justify heuristically than positive coefficients.

Any of a wide range of information for a candidate parametric model may be included within the report provided to the user at operation 85. For example, the report for a single candidate model may include the following three (3) sets of information: model level information, the equation or model summary, and the correlation matrix. Other examples of information that may be included in the reports includes summary supplier comparisons and rankings, and tests of stability of the model. Tests of stability may include statistical measures of variation or more computationally intensive results such as bootstrap regression tests.

The model level information may include information as to the node, the attributes selected, the attributes excluded in constructing the branch, the subset and attributes included/excluded in the branch, and statistical summary data such as sums of errors and the model's F-score. The equation or model summary may show the attributes selected, the intercept, the coefficients, standard errors, t-statistics, probabilities associated with the t-statistics and a support measure. The support measure for an attribute is the number of observations that differ from the mode. The support measure for an intercept, however, is zero and thus meaningless. Thus, the support measure cell for the intercept may instead be used to provide the number of predicted values that differ from the intercept, which is a useful indicator as to whether the candidate model has a non-trivial prediction.

In addition to displaying information for a candidate model, the report may also be interactive. For example, the user may be able to choose to have the results formatted and then printed.

Operation 86 allows the user to save the regression results for a candidate model and extend the results to another software application or modeling tool (e.g., JMP®, Statistica®, among others). That is, the system 10 provides support for allowing a user to utilize another modeling tool for the "finish" work, such as graphing of the regression fit or adding additional attributes. The user may be able to link to the external modeling tool by activating a button or link on the interface 20.

The interface 20 also allows the user to select an export output style at operation 88. For example, the user may choose to export a single subset as a text file written in JMP® scripting language (JSL), which would then allow the subset to be run or executed by JMP® (e.g., JMP® Forward Stepwise Regression, JMP® Linear Regression). Additionally, or alternatively, the user may also choose to export the attribute data 26 to a JMP® data table along with the JSL text file. Similar functionality may be incorporated for other external tools such as Statistica®.

At operation 89, the interface 20 allows the user to choose to view another report for the next candidate model. If the user chooses to view another candidate model report, the interface 20 returns back to operation 85 whereat the next candidate model report is displayed in the manner previously described.

The regression analysis tree program 18 of the present invention will now be discussed in greater detail. As shown in FIG. 1, the regression analysis tree program 18 is preferably a procedural algorithm separate from the interface 20, although such is not required. Generally, the regression analysis tree program 18 uses a modified version of forward stepwise regression to build a tree of regression formulas in accordance with the user-specified inputs via the interface 20 at operations 54 through 78, shown in FIG. 2. After the tree is constructed, the regression analysis tree program 18 evaluates the attribute subsets, that have not yet been evaluated, for each tree branch in compliance with a processing-time reduction test (e.g., a minimum $R^2$ (coefficient of multiple determination) value set by the user).

The results produced during the execution of the regression analysis tree program 18 are automatically stored in a suitable data storage structure 34 (e.g., database, nested array, etc.). The system 10 collects and stores information about each regression formula such as details about the attributes used and coefficients as well as a number of summary statistics including each model's adjusted $R^2$, among other statistics.

FIG. 4 is a functional block diagram of the regression analysis tree program 18 delineating a number of the salient features and operations according to one embodiment of the present invention. The execution of the regression analysis tree program 18 is initiated by the user via the interface 20 at operation 80 (FIG. 2A).

Referring back to FIG. 4, operation 90 of the regression analysis tree program 18 comprises selecting a single run from the one or more runs in a batch of runs to perform, that is if the user selected to run a batch of datasets at instead of the currently selected dataset.

Operation 91 comprises loading the user-specified controls. That is, the run controls include the tree controls entered at operation 74 (e.g., the maximum number of attributes, the maximum number of possible attributes chosen for each variable in the tree), the attribute selections entered at operation 76 (e.g., attributes to exclude, attributes to include), and/or the part selections entered at operation 78 (e.g., parts to exclude, parts to include).

Operation 92 (FIG. 4) of the regression analysis tree program 18 comprises loading the attribute data 26. Operation 92 may implement loading data from a JMP® data table or from one or more Microsoft® MS Access tables. Text attributes may be separated from numeric attributes for separate handling. For example, the system may construct indicator attributes for all combinations of subsets of values of a text variable and use these indicator attributes to modify existing numeric attributes. Note that from one text (or categorical) attribute with v distinct entries there are $2^{v-1}-1$ indicator attributes and combinations (the v−1 exponent follows from omitting the indicator for the modal value of the text attribute). Given p original numeric attributes, operation 92 may construct $p*(2^{v-1}-1)$ combination attributes by multiplying one of the indicator attributes and one of the numeric attributes.

In operation 94, the resource analysis tree program 18 sets up statistical tables and/or statistical summaries using the attribute data 26, such as a matrix of correlations for the various attributes. The tables and summaries are logged and saved for later use.

The system 10 may reuse the functionality of existing tools and resources when setting up the statistical tables and/or calculating statistical summary information at operation 94. The system 10 includes the capability to read attribute files from any of wide range of tools and resources (e.g., JMP® tables, Microsoft® MS Access tables, etc.). For example, the system 10 may run JMP® Scripting Language (JSL) to set up a data table comprising data imported from Microsoft® MS Access using Open Database Connectivity (ODBC). During this process, multiple tables may be joined if the number of columns exceeds 255 (the current system limit in MS Access). After the data table is created, the data table may then be saved as a JMPO table and imported for use by the regression analysis tree program 18. The system 10 may also build JSL not only to run candidate models in JMP® but also to use the graphing features of JMP®.

In the next operation 96, the regression analysis tree program 18 analyzes the attribute data 26 to create a list of available attributes. More specifically, the regression analysis tree program 18 filters or sifts through the attribute data 26 to remove duplicates, poorly supported attributes and attributes the user has designated for exclusion during operations 76 and 78 of the interface 20 (FIG. 2).

In operation 98, the regression analysis tree program 18 runs single variable regression formulas for each attribute within the list of available attributes created at operation 96. Although other objective functions may be used, the regression analysis tree program 18 preferably calculates F-scores for each available attribute at operation 98. The F-score was selected as the objective function measuring "goodness of fit" because the F-score is used in standard forward stepwise regression. This choice for the goodness of fit objective function permits validating the methodology of this invention using existing tools. Other goodness of fit objective functions may also be constructed.

Calculating F-scores for regression testing is a common process known in the art. Although calculating F-scores is known in the art, a brief description of the process will be given will be given in order to provide a more understandable basis for understanding the present invention.

The F-score calculations begin with the relationship:

$$\text{Variance}[P] = \text{Variance}[P_{hat}] + \text{Variance}[\text{Residual}]$$

In the above equation, Residual=$P-P_{hat}$. It is a common practice to write, with n being the number of parts: SSE ($P_{hat}$)=n*Variance[Residual]. Using an unbiased estimator of variance, the factor n is replaced by (n−1). Working through the forward stepwise process, there are two predictions. One prediction uses the attributes selected at the current branch and can be denoted as $P_{hat}$. The other prediction uses the current branch plus one of the available attributes and can be denoted as $P_{hat2}$. If n represents the number of parts and p the number of attributes used in $P_{hat}$ (including the intercept), then F-score for the attribute added in $P_{hat2}$ is equal to $[\text{SSE}(P_{hat})-\text{SSE}(P_{hat2})]/[\text{SSE}(P_{hat2})/(n-1-p)]$.

In addition, there is an F-score for the model giving $P_{hat2}$ which can be used as alternative objective function for the forward stepwise process in the present invention. The F-score for the model $P_{hat2}$ is equal to $[n*\text{Variance}(P_{hat2})/(p+1)]/[\text{SSE}(P_{hat2})/(n-1-p)]$.

Other choices for the objective function may also be developed. Each may build somewhat different tree structures.

At operation 100, the forward stepwise process is initialized. That is, the single variable regression formulas produced during operation 98 are ranked by decreasing F-scores so that a selection can be made as to the top performing attribute candidates (i.e., those having the highest F-scores) for the first level of the tree. The number of top performing attribute candidates that are chosen for the first tree level may be determined by the user inputs at operation 74 (FIG. 2).

Operations 102 and 104 are described in greater detail below and shown in FIGS. 5 and 6, respectively. Briefly, however, operation 102 comprises building the second and subsequent tree nodes, and operation 104 comprises testing branches and attribute subsets of the tree. After completion of the testing at operation 104, a determination is made at operation 105 as to whether there are any more runs to be performed. If so, the process returns to operation 90 for selection of another run or dataset, and operations 91 104 are repeated for the newly selected run. However, if it is determined at operation 105 that there are no more runs to be performed, then operation 106 of the regression analysis tree program 18 returns the user to operation 82 of the interface 20 (FIG. 2).

Upon completion of the execution of the regression analysis tree program 18, the user will have zero or more candidate models to review. If there are no candidate models to review, the modeler will need to subdivide or breakup the statement of work (SOW) into subsets, collect additional attributes, and/or construct additional attributes. If there is a single candidate model to review, the single model may then be checked for reasonability so that a decision can be made as to whether the model should be accepted or rejected. If the results include 2 or more candidates to review, the candidates may be compared to each other in the manner more fully described above.

Figure 5:
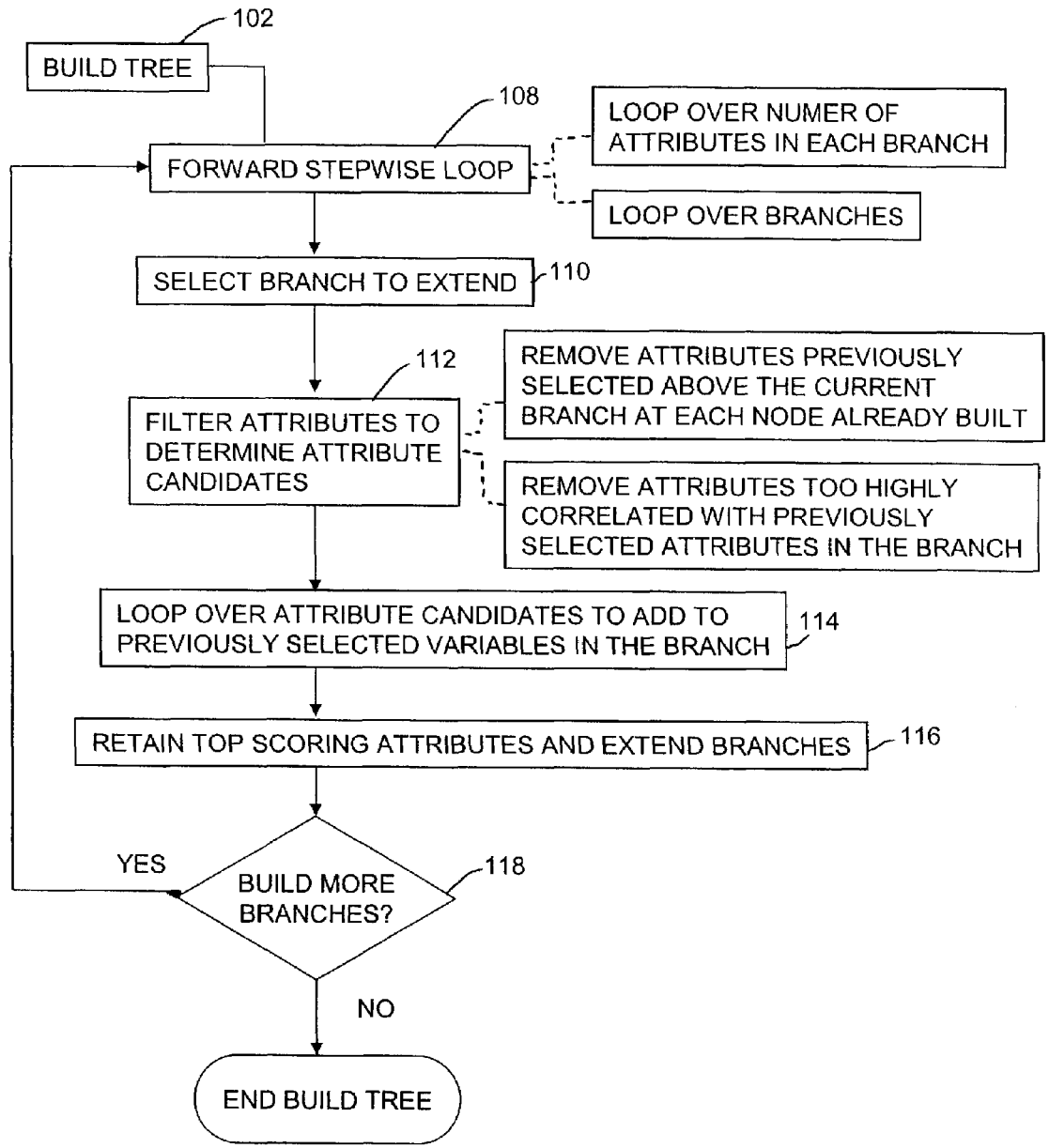
FIG. 5 is a functional block diagram of the tree building operation of the regression analysis tree program shown in FIG. 4.

FIG. 5 is a functional block diagram of the tree building operation 102 of the regression analysis tree program 18. At operation 102, the regression analysis tree program 18 builds the branches extending from the attributes previously chosen for the first tree level at operation 100. That is, the regression analysis tree program 18 at operation 102 selects the attributes for the second and subsequent levels of the tree.

As shown in FIG. 5, the regression analysis tree program 18 includes a forward stepwise loop 108. The forward stepwise loop 108 controls the looping over the number of attributes in each branch and the looping over the branches. Within the loop 108, the regression analysis tree program 18 selects a branch to extend at operation 110.

To extend the selected branch, the regression analysis tree program 18 at operation 112 filters available attributes to determine the attribute candidates. More specifically, the order of the attributes is useful in the filtering of the attributes at the subsequent nodes along each branch of the tree. To analyze any branch, all attributes chosen above the current branch at each node already built are filtered out of (i.e., removed from) the available attributes. In addition, the attributes having a correlation with a previously selected attribute in the selected branch that is higher than a user-specified threshold value are also removed from the available attributes.

The steering control mechanism provided via operation 112 removes the highly correlated attributes which might otherwise cause a candidate model to fail a simple reasonability test requiring that there not be too high a correlation between two or more attributes. With known processes, the reasonability test can only be applied after a candidate model has been constructed, which often results in the loss of significant amounts of time and resources on the development of parametric models that are later determined to be unreasonable for having too high a correlation between two or more attributes. By removing the highly correlated attributes before the tree branch is constructed, the present invention eliminates, or at least reduces, the amount of time and resources that might otherwise be wasted on the development of unreasonable parametric models. Other control mechanisms may be constructed to optimize different characterizations of an ideal parametric model.

After the attributes have been filtered at operation 112, the remaining available attributes constitute the attribute candidates for constructing the next node. Because each of the attribute candidates or choices may be a useful selection for the node, however, each attribute candidate is evaluated at operations 114 and 116 to determine and retain the top performing attribute candidates. Operation 114 comprises a loop over the attribute candidates to add to the previously selected variables in the branch. Operation 114 involves calculating regression formulas for each of the attribute candidates. Operation 114 also includes logging or saving tracking information, statistical results, and co-linearity results for the nodes and branches.

At operation 116, the regression formulas calculated at operation 114 are ranked by decreasing F-score. Then, the top performing attribute candidates having the highest F-score are retained for the node along the current branch being extended.

After the branch has been extended to completion, operation 118 determines whether more branches are to be built. If it is determined that no further branches need be built, then the building tree process is complete and the regression analysis tree program 18 proceeds onward to branch and subset testing operation 104 (FIG. 4). However, if it is determined that one or more branches still need to be extended or built, then the process shown in FIG. 5 is repeated for each of the additional branches to build the full tree.

Figure 3:
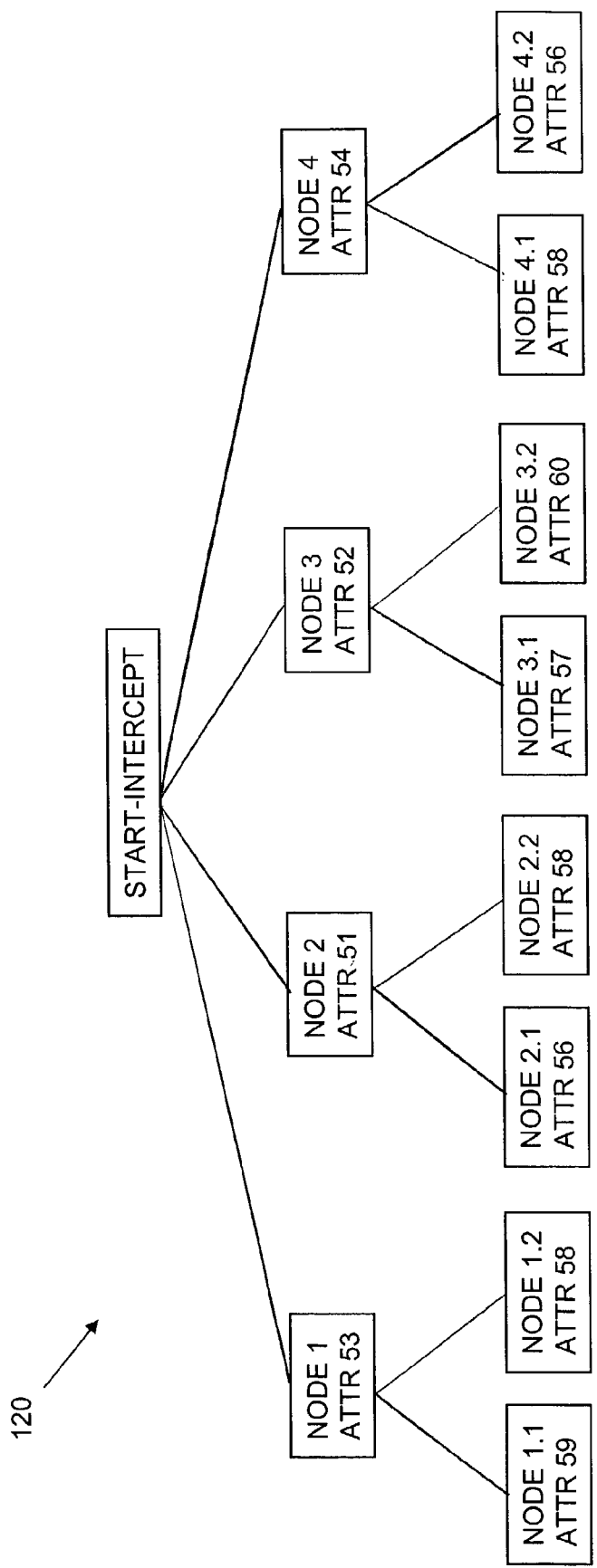
FIG. 3 is a diagram of an exemplary tree that may be constructed by the system shown in FIG. 1.

An exemplary tree 120 that may be constructed with the regression analysis tree program 18 is shown in FIG. 3. The selection of attributes to make the tree 120 is guided by the user/modeler controlled settings entered at operations 54 through 78 (FIG. 2) (e.g., tree controls, suppressed attributes, etc.). As shown, the tree 120 has a depth of two (2) tree levels and "4.2" pattern (i.e., the first tree level is limited to four (4) attribute choices or nodes with each subsequent tree level thereafter being limited to two (2) attribute choices or nodes). Accordingly, the tree 120 includes a total of 8=4*2 possible branches in the analysis. It should be noted, however, that more complex trees may also be constructed by the regression analysis tree program 18 than what is shown in FIG. 3.

The following exemplary process may be used to select the attribute for node 4.2 of tree 120. For this example, it has been assumed that each of the attributes listed in the following table are adequately supported. It should be noted, however, that the following example is for illustration purposes only and should not be construed as limiting the invention.

| Attribute Number | Attribute Name |
| --- | --- |
| 51 | Weight |
| 52 | Volume |
| 53 | Area |
| 54 | Length |
| 55 | Width |
| 56 | Number of braces |

-continued

| Attribute Number | Attribute Name |
| --- | --- |
| 57 | Number of rivets |
| 58 | Number of parts in assembly |
| 59 | Polished or painted (0 for no, 1 for yes) |
| 60 | Number of hinges |

The correlations for the attributes 51 through 60 are shown in the following symmetric matrix wherein the lower half is the transpose of the upper half:

| Attribute Number | 51 | 52 | 53 | 54 | 55 | 56 | 57 | 58 | 59 | 60 |
| --- | --- | --- | --- | --- | --- | --- | --- | --- | --- | --- |
| 51 | 1.0 | .9 | .85 | .8 | .7 | .5 | .5 | .6 | −.2 | .3 |
| 52 |  | 1.0 | .9 | .75 | .65 | .7 | .5 | .5 | −.1 | .4 |
| 53 |  |  | 1.0 | .9 | .75 | −.3 | .9 | .2 | 0 | .6 |
| 54 |  |  |  | 1.0 | −.7 | .2 | .8 | .3 | 0 | .7 |
| 55 |  |  |  |  | 1.0 | −.4 | .4 | .1 | 0 | .2 |
| 56 |  |  |  |  |  | 1.0 | .7 | .7 | −.1 | 0 |
| 57 |  |  |  |  |  |  | 1.0 | .8 | .2 | −.2 |
| 58 |  |  |  |  |  |  |  | 1.0 | .2 | .1 |
| 59 |  |  |  |  |  |  |  |  | 1.0 | 0 |
| 60 |  |  |  |  |  |  |  |  |  | 1.0 |

It has been assumed for purposes of this example that the maximum allowed correlation between two attributes is 0.65, although other values may be used.

The forward stepwise regression is initialized by calculating single variable regressions of Price=A+B*(attribute). The single variable regressions are ranked by decreasing F-score so that a selection can be made as to the top performing attribute candidates having the highest F-score.

| Attribute number | F-score |
| --- | --- |
| 51 | 35 |
| 52 | 25 |
| 53 | 42 |
| 54 | 20 |
| 55 | 15 |
| 56 | 14 |
| 57 | 17 |
| 58 | 10 |
| 59 | 8 |
| 60 | .5 |

As shown in the above table, the top performing attribute candidates are attributes 53, 51, 52, and 54 in descending order of F-score. Thus, attributes 53, 51, 52, and 54 are selected for the first tree level (i.e., Node 1, Node 2, Node 3, and Node 4).

To develop the sub-tree (i.e., extend the branches) from Node 4, the attributes 51 through 60 are filtered. Specifically, attributes 53, 51, and 52 are removed from the available attributes because they precede attribute 54 as choices in the first level at Nodes 1, 2, and 3. The remaining attributes thus include attributes 55 through 60. As shown in the table below, attributes 55, 57 and 60 each have a correlation with attribute 54 in absolute value that is greater than the allowed maximum correlation (0.65). Accordingly, attributes 55, 57 and 60 are also filtered or removed from the available attributes. Consequently, the remaining attributes left to test are attributes 56, 58 and 59.

| Attribute Number | 55 | 56 | 57 | 58 | 59 | 60 |
|---|---|---|---|---|---|---|
| 54 | −.7 | .2 | .8 | .3 | 0 | .7 |

The following table sets forth assumed 2 variable F-scores for attribute 54 (the attribute previously selected at Node 4) and each of the remaining attributes 56, 58, and 59.

| Attribute Numbers | F-score |
|---|---|
| 54 and 56 | 5 |
| 54 and 58 | 7 |
| 54 and 59 | 3 |

As shown above, the top two scores belong to the attributes 58 and 56, which are thus choices for the second node along this branch. That is, the choices at Node 4.1 are attributes 54 and 58, and the choices at Node 4.2 are attributes 54 and 56.

Although not shown in FIG. 3 as the depth of the tree is limited to two (2) tree levels, the aforementioned process of selection and exclusion may be continued to further develop the tree. To select a third attribute in the formula along the branch 4.2 (i.e., to determine which attributes may be choices for Node 4.2.1), a determination is made as what attributes must be filtered or excluded from the available attributes. Once again, attributes 53, 51 and 52 are removed because they precede attribute 54 as choices in the first tree level at Nodes 1, 2, and 3. In addition, attribute 58 is removed because it precedes attribute 56 as a choice in the second tree level at Node 4.2 following along the fourth branch. At this point, choices made along other branches are not considered. Accordingly, the attribute filtering process leaves attributes 55, 57, 59, and 60 to check for suitable correlations:

| Attribute Number | 55 | 57 | 59 | 60 |
|---|---|---|---|---|
| 54 | −.7 | .8 | 0 | .7 |
| 56 | −.4 | .7 | −.1 | 0 |

Of these choices, only attribute 59 passes the correlation filter such that the choices for node 4.2.1 are attributes 54, 56 and 59. However, it should be noted that if attribute 59 is a linear combination of attributes 54 and 56, the process may need to invert a degenerate or singular matrix. A degenerate matrix will occur with any set of attributes which are linearly dependent. However, a degenerate matrix is not invertible and the process will set an error code denoting the type of error encountered in the inversion routine and the model F-score will be set to 0 (zero) and no further testing need be done with this set of attributes. The user will be able to discover whether attribute 59 is a linear combination of attributes 54 and 56 by way of the error code being logged during the matrix inversion process.

It should also be noted that the attributes chosen for the second and later nodes in the tree need not be the same from one branch to another. For example, and as shown in FIG. 3, the attribute chosen for node 4.2 of tree 120 differs from that chosen for node 2.2. or 3.2. Although each branch of the tree will include a unique set of attributes such that no two branches of the tree will be identical, there may nevertheless be substantial overlap in the attributes of two or more branches.

Once the tree is built, testing operation 104 of the regression analysis tree program 18 is commenced relatively immediately thereafter. Preferably, the testing operation 104 occurs in an automated fashion such that user interaction is not required for initiation thereof.

Figure 6:
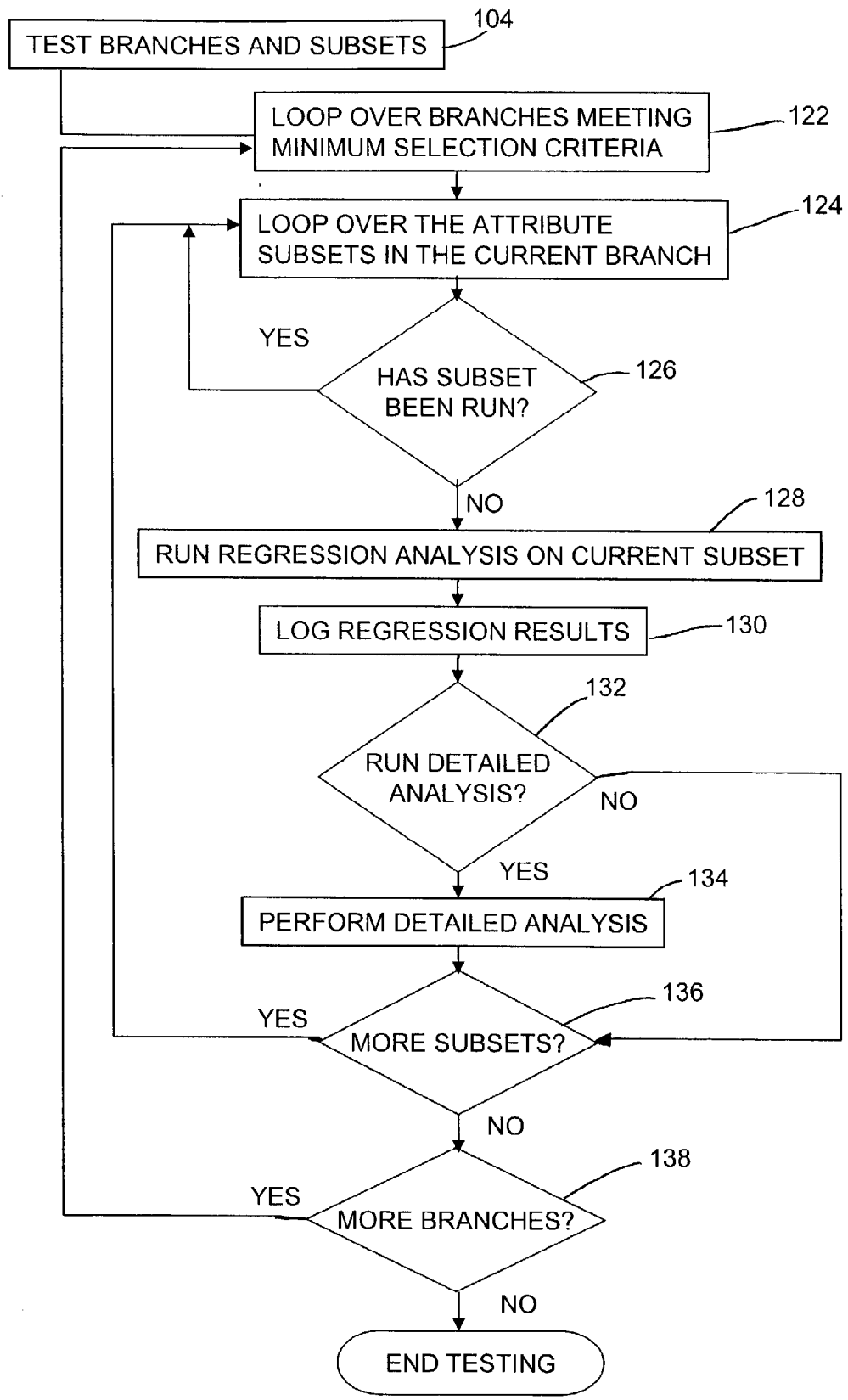
FIG. 6 is a functional block diagram of the branch and subset testing operation of the regression analysis tree program shown in FIG. 4.

As shown in FIG. 6, operation 104 includes a loop 122 over the branches meeting minimum selection criteria. Preferably, the regression analysis tree program 18 evaluates the attribute subsets in a branch only when that branch, as a whole (i.e., the whole set of attributes for the branch), satisfies or meets a processing-time or run-time reduction test, such as a minimum $R^2$ (coefficient of multiple determination) value set by the user. In such an embodiment, the branches that do not exceed the minimum $R^2$ value are excluded from the evaluation process, which in turn may substantially reduce processing time.

The operation 104 further includes a loop 124 over the possible subsets of attributes in the current branch. To avoid duplication of effort, however, a determination is made at operation 126 as to whether the current subset has been previously tested. If so, the subset is skipped and the process returns to operation 124 for selection of another subset. However, if it is determined that the subset has not been run, the process continues onward to operation 128. By skipping and thus not reevaluating the duplicated attribute subsets, the invention avoids wasteful repetition and reduces the amount of processing time required to evaluate all of the attribute subsets for the tree.

During operation 128, a regression analysis is performed on the current attribute subset to produce regression results for the current attribute subset. The regression results (e.g., statistic results, coefficients, etc.) produced by the regression analysis at operation 128 are logged at operation 130.

At the next operation 132, the regression results produced at operation 128 are analyzed to determine whether further testing should be performed on the current subset. For example, operation 132 may include determining whether the current subset has an $R^2$ value that exceeds a user-specified minimum $R^2$ value. If not, then the process proceeds to operation 136, discussed below. However, if it is determined that the current subset does have an $R^2$ value exceeding the user-specified minimum $R^2$ value, then a more detailed analysis is conducted on the current subset at operation 134. The use of $R^2$ as the branch pruning objective function is exemplary and depends on the anticipated use of the regression model. Other desirable criteria for a useful model may suggest differing branch pruning objective functions and the use of $R^2$ in this manner should not be construed as limiting the scope of the present invention.

At operation 134, the more detailed analysis may include, but is not limited to, performing outlier analysis, calculating a stacking index, counting negative predicted prices (with or without outliers), calculating maximum predicted-to-actual ratios, calculating Money On The Table" or "MOTT", among other possible statistical testing.

In the next operation 136, a determination is made as to whether there are any remaining subsets of the current branch that have not been tested. If not, the process proceeds onward to operation 138, described below. However, if it is determined at operation 136 that there is at least one remaining untested subset for the current branch, then the process returns back to operation 124 whereat another subset is selected. Operations 126 through 136 are then repeated for the newly selected subset.

Once all subsets within a given branch have been analyzed, a determination is then made at operation 138 as to whether there are any untested branches that have $R^2$ values exceeding the user-specified minimum $R^2$ value. If so, the process returns back to operation 122 whereat another branch is selected. The operations 124 through 138 are then repeated for the newly selected branch. However, if it is determined at operation 138 that there are no remaining untested branches, then the testing operation 104 is complete and the regression analysis tree program 18 proceeds onward to operation 106 (FIG. 4). At operation 106, the user is returned to the interface 20 (FIG. 2) so that the user may select and view the model results at operation 82 in the manner previously described.

Although they are not shown in the accompanying Figures, the optimized parametric modeling process may also include additional operations, which may be automated, manual, or a combination thereof. For example, the optimized parametric modeling process may further include reviewing the model attributes for plausibility and reasonableness, which may be ascertained by reviewing the sparseness setting to determine whether to keep, suppress or raise the sparseness setting, by reviewing the equation coefficients, by discussing the equation with the modeler, and/or by reviewing suppressed attributes for reasonability. The optimized parametric modeling process may also include supplier analysis testing to determine which suppliers are deemed "Best in Class" (BIC).

Other operations might include retesting regressions after outliers are excluded, after the intercept is suppressed, after the minimum $R^2$ is increased, and/or after the maximum number of attributes is set higher.

Yet another possible operation includes using the results obtained for a plurality of parametric models to determine whether specific subsets of parts are substantially over- or under-predicted consistently. Even though such subsets may not be statistical outliers, these subsets might be removed from the parametric models and treated in separate models.

As briefly described earlier, the interface 20 preferably comprises a plurality of interactive screens (e.g., panels and dialog boxes shown in FIGS. 7 through 16) that may be displayed on the output component or display 24 of the system 10. The user may interact (e.g., enter or change data within a panel) with the screens by using the input device 22 of the system 10. It should be noted, however, that a user need not necessarily enter the input parameters or access the interactive screens in the order that is shown in FIGS. 7 through 16 or described below. Moreover, it should be noted that the plurality of interactive screens shown and described herein are for descriptive purposes only and should not be construed as limiting the scope of the present invention.

Figure 7:
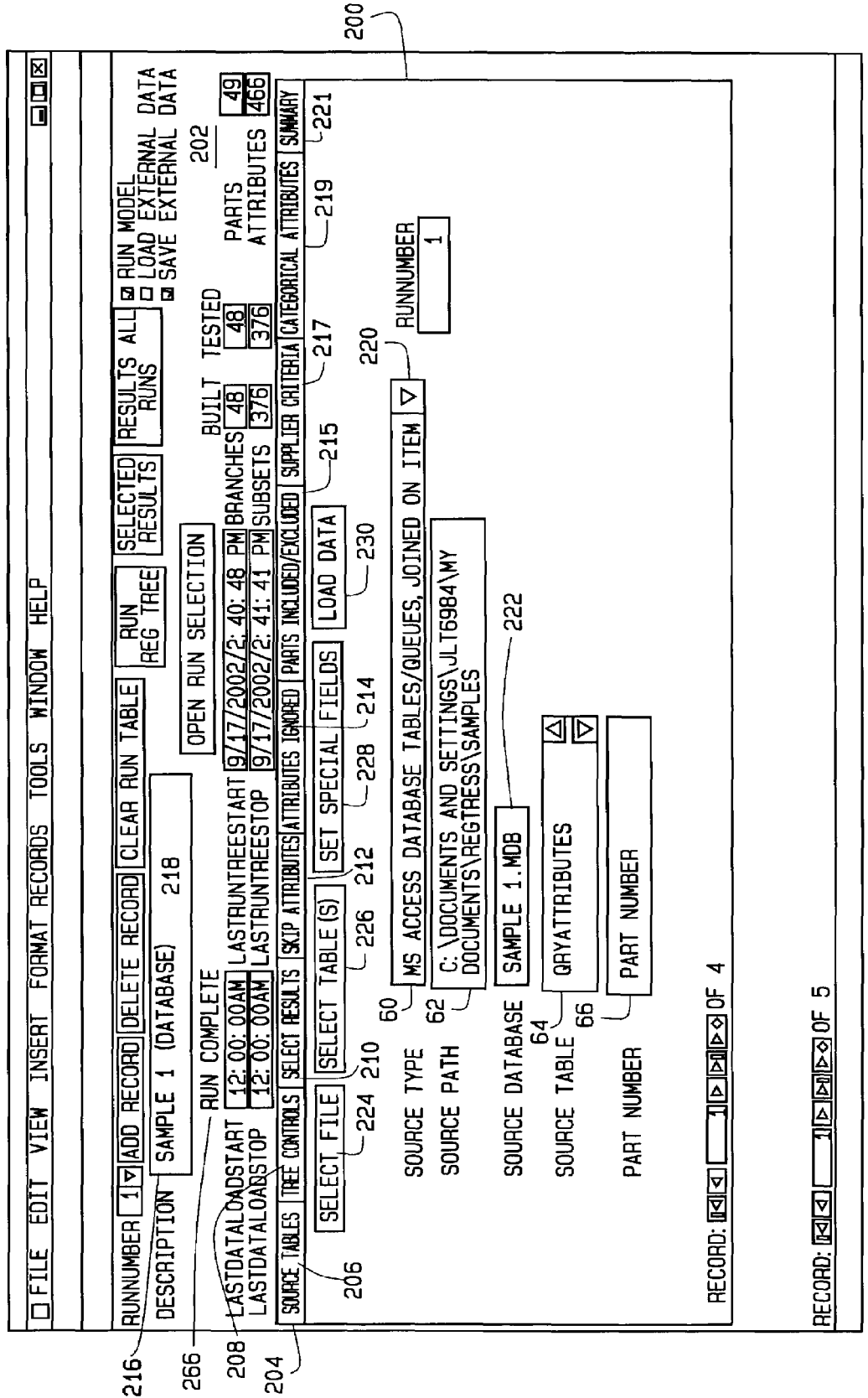
FIG. 7 is an illustration of a Sources Table panel that may be displayed upon execution of the interface by the system shown in FIG. 1.

FIG. 7 is a Sources Table panel 200 that may be displayed via output component 24 upon execution of the interface 20 by the processor 16. Each interactive screen comprising the interface 20 includes a panel layout 202. The panel layout 202 may comprise a plurality of panel tabs 204 that allows the user to navigate through the various interactive screens of the interface 20. When a panel tab is activated by the user with the input device 22, the corresponding panel is displayed on the output component 24. In a preferred embodiment, the panel tabs 204 include a Source Tables tab 206, a Tree Controls tab 208, a Select Results tab 210, a Skip Attributes tab 212, an Attributes Ignored tab 214, a Parts Included/Excluded tab 215, a Supplier Criteria tab 217, a Categorical Attributes tab 219, and a Summary tab 221. It is envisioned, however, that the panel tabs 204 may also include other tabs associated with other panels of the interface 20.

As an alternative to the panel tabs 204, the optimized parametric modeling process could proceed in a step-by-step fashion such that the user would be required to enter the requested data in an interactive screen before advancing on to another interactive screen. For example, upon execution of the user interface program 20, the Source Tables panel tab 206 may be the only panel tab 204 available to a user with the remaining panel tabs 208 through 214 being disabled. Accordingly, the user would not be able to advance to a subsequent panel until all the data requested in the Source Tables panel 200 is entered. Once the user completes entering the data requested on the Source Tables panel, the user may then activate or click a next button (not shown) and/or the next panel tab (e.g., Tree Controls tab 208) to advance.

Generally, the Source Tables panel 200 allows the user to either designate an existing run or add a new run at operation 54 (FIG. 2) and to enter a description or case name 216 into a text entry box 218 provided in the Source Tables panel 200. By entering the description, the user may provide information relating to the project for ease of identification of the project. The description contained in the text entry box 218 does not affect the output of the optimized parametric modeling process.

Figure 8:
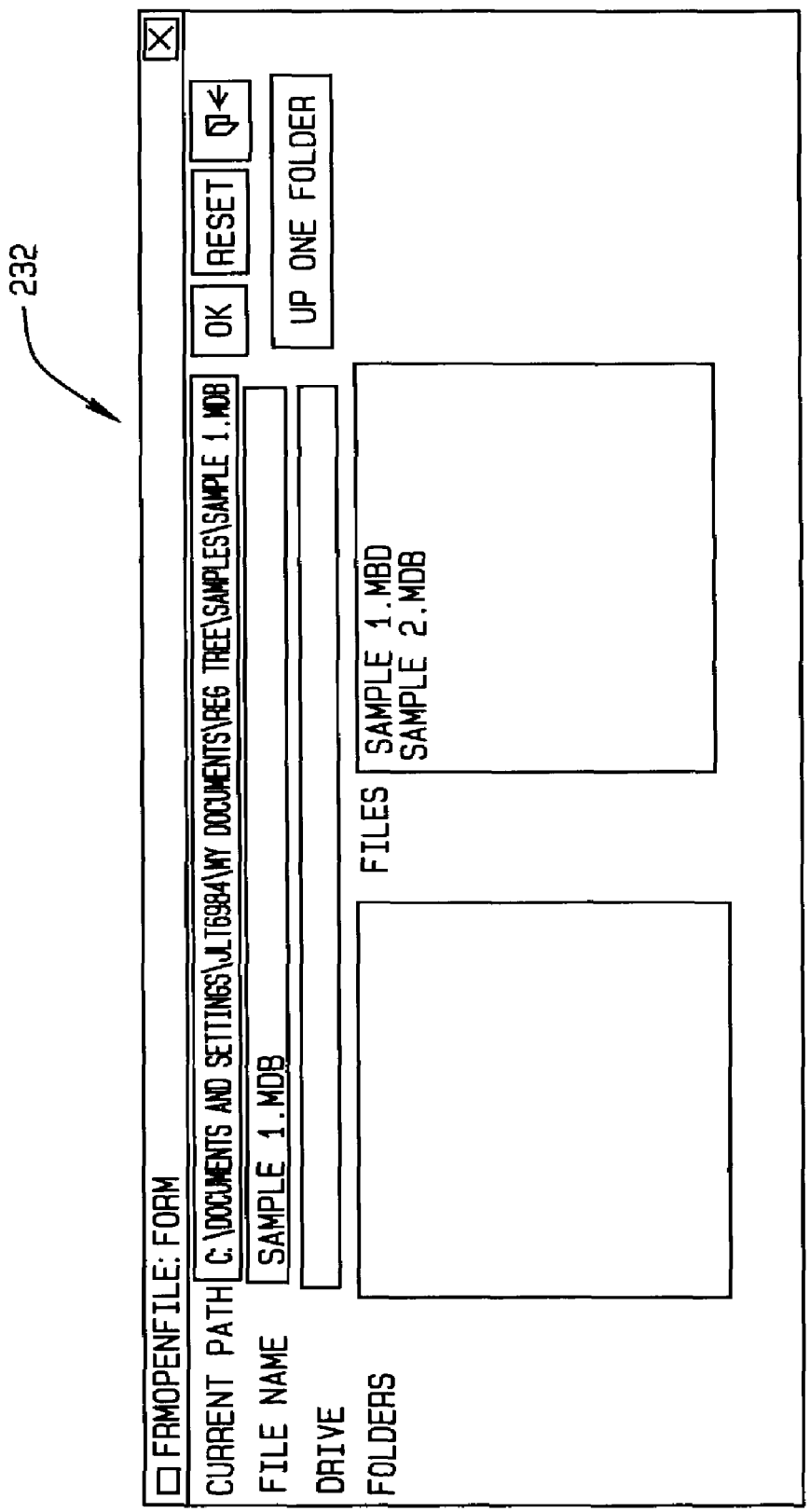
FIG. 8 is a an illustration of a Select File panel that may be after the Select File button has been selected.
Figure 9:
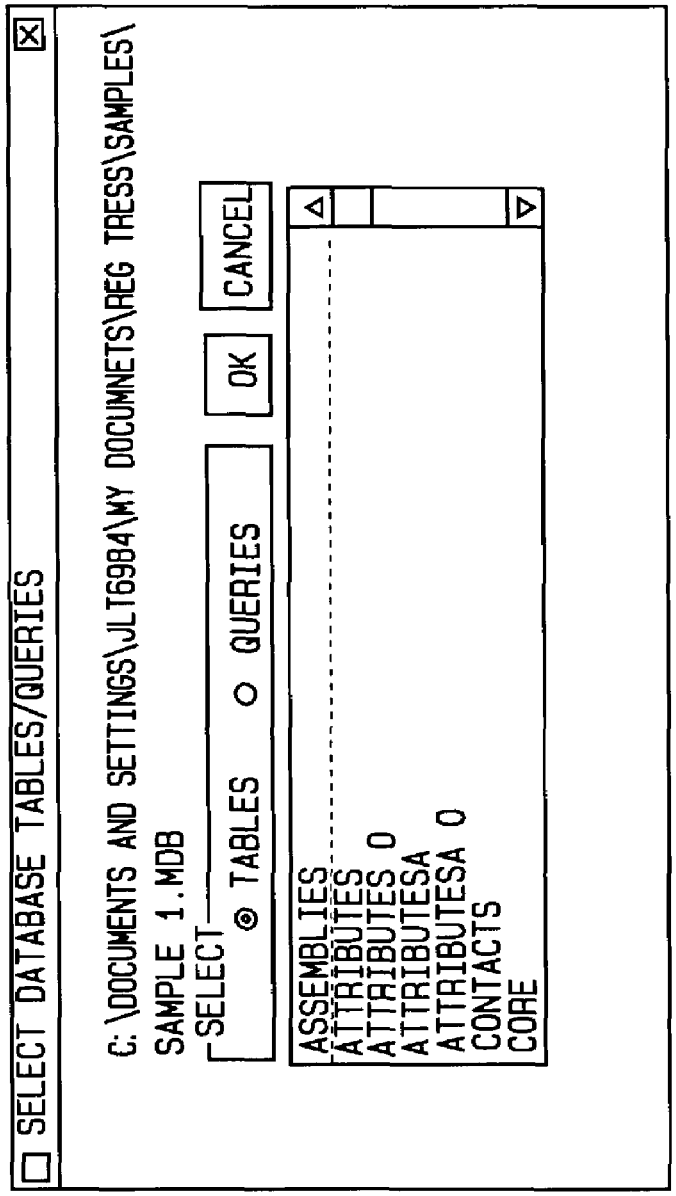
FIG. 9 is a an illustration of a Select Table(s) panel that may be after the Select Table(s) button has been selected.

The Source Tables Panel 200 also allows the user to define the data source for the attribute data 26 at operation 58 shown in FIG. 2. Specifically, the user may be able to designate for the attribute data 26 the following information: the data source type 60 (e.g., general database source, such as a Microsoft® MS Access Database table, a JMP® data table, among other data source types), the source path 62, the source database 64 and/or the source table 66 by accessing drop-down boxes 220 and/or manually typing the appropriate text into data fields 222. The Source Tables Panel 200 also includes a further includes a Select File button 224, a Select Table(s) button 226, a Set Special Fields Button 228, and a Load Data button 230. Activation of the Select File button 224, Select Table(s) button 226, or Set Special Fields Button 228 causes the corresponding panel 232, 234 or 236, which are shown in FIGS. 8, 9 and 10, respectively, to be displayed on display 24.

Figure 11:
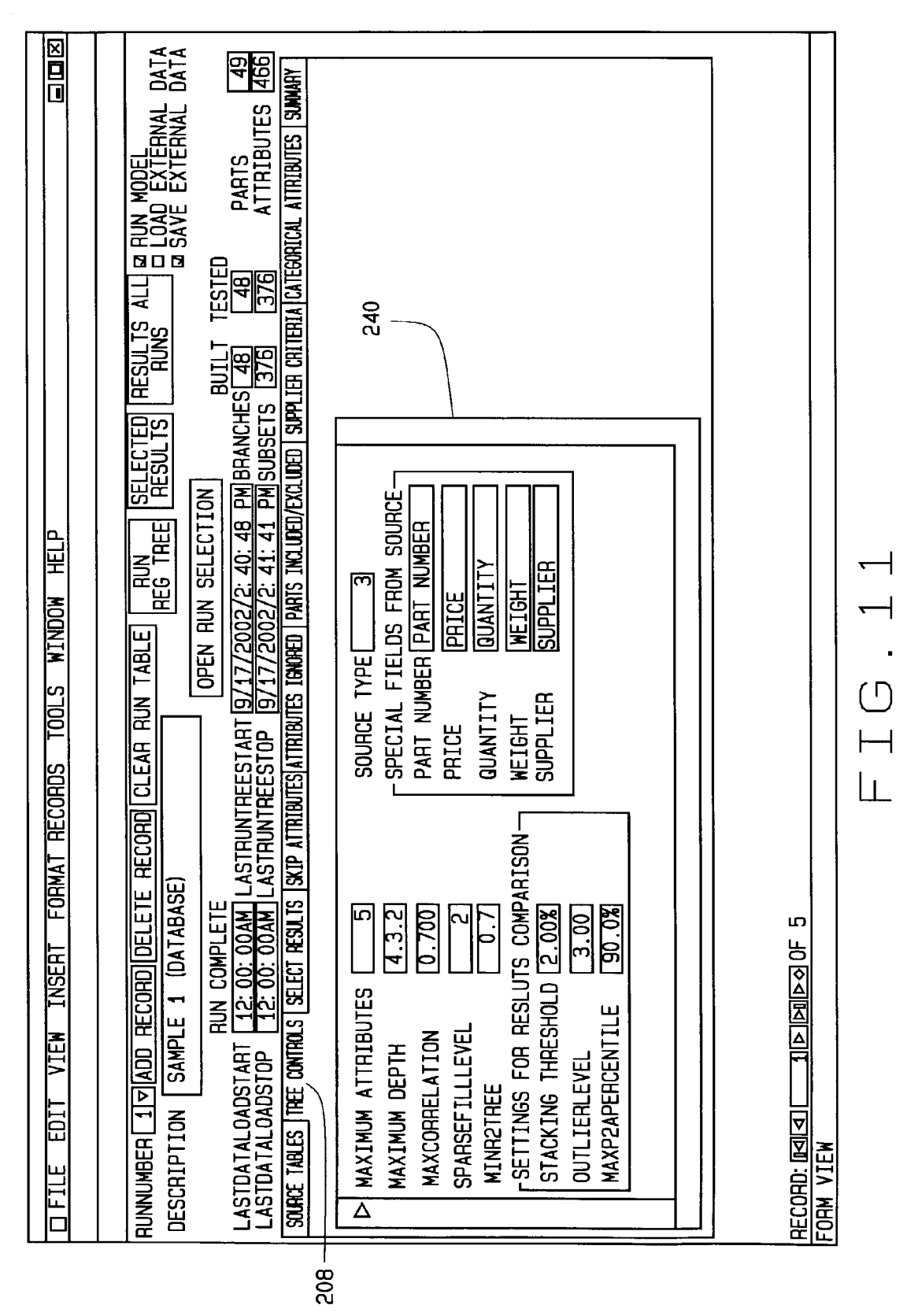

FIG. 11 is an illustration of the Tree Controls panel 240 that may be displayed on display 24 after the Tree Controls tab 208 has been selected. Generally, the Tree Controls panel 240 allows the user to enter settings for defined controls on the tree at operation 74 shown in FIG. 2. As shown in FIG. 11, the Tree Control panel 240 includes data entry fields 242 into which the user may enter numerical values for such things as maximum number of attributes, maximum depth, maximum allowable correlation, sparse fill level (minimum non-modal values), minimum $R^2$, stacking threshold, outlier level, maximum Predicted to Actual ratio, source type, special fields from the source (e.g., part number, price, quantity, weight, supplier, etc.), among other possible tree controls.

Figure 12:
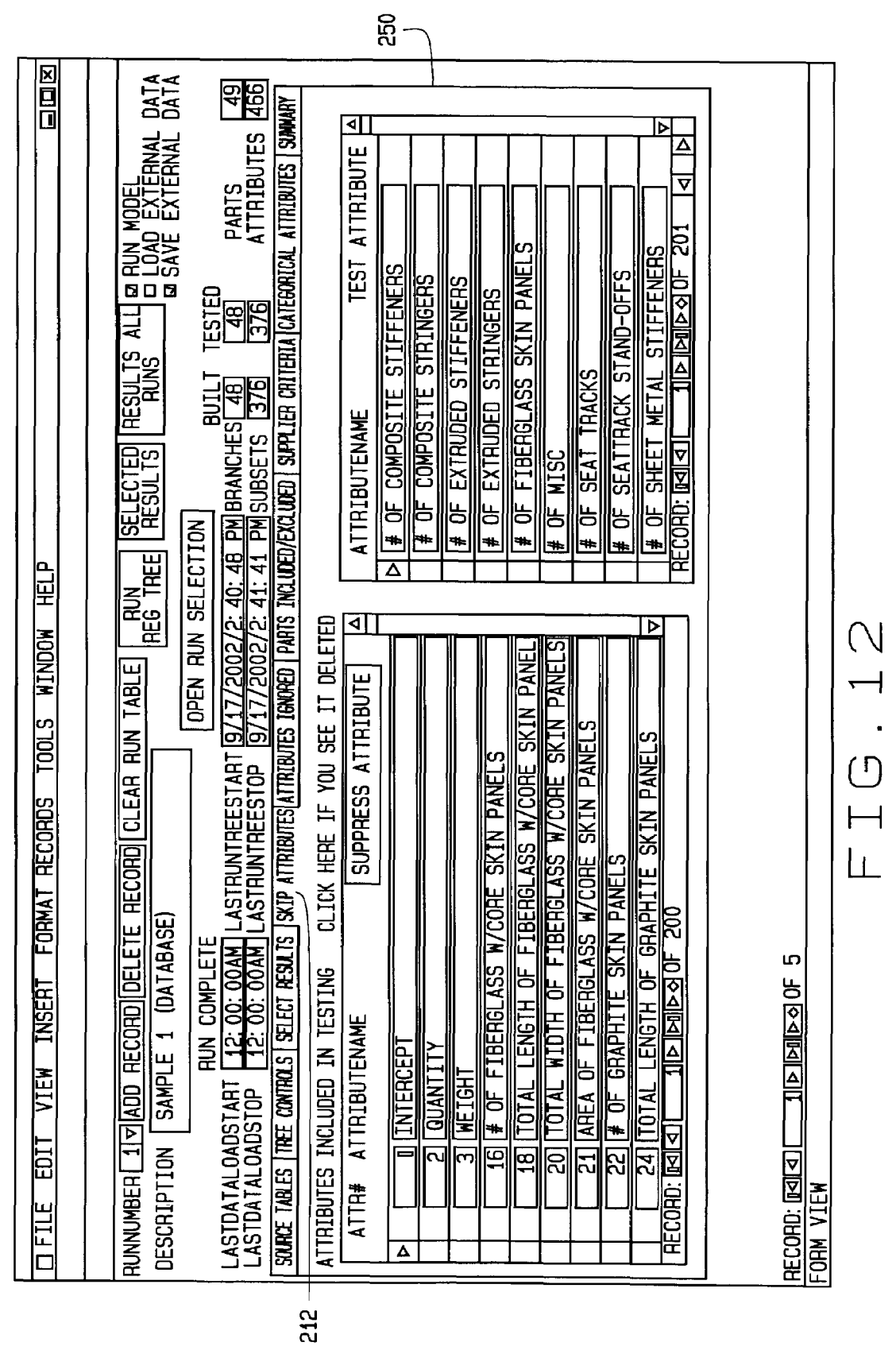

FIG. 12 is an illustration of the Skip Attributes panel 250 that may be displayed on display 24 after the Skip Attributes tab 212 has been selected. Generally, the Skip Attributes panel 250 allows the user to suppress certain attributes at operation 76 (FIG. 2) after the data has been imported. The suppressed attributed are thus excluded from consideration during the parametric modeling process.

Figure 13:
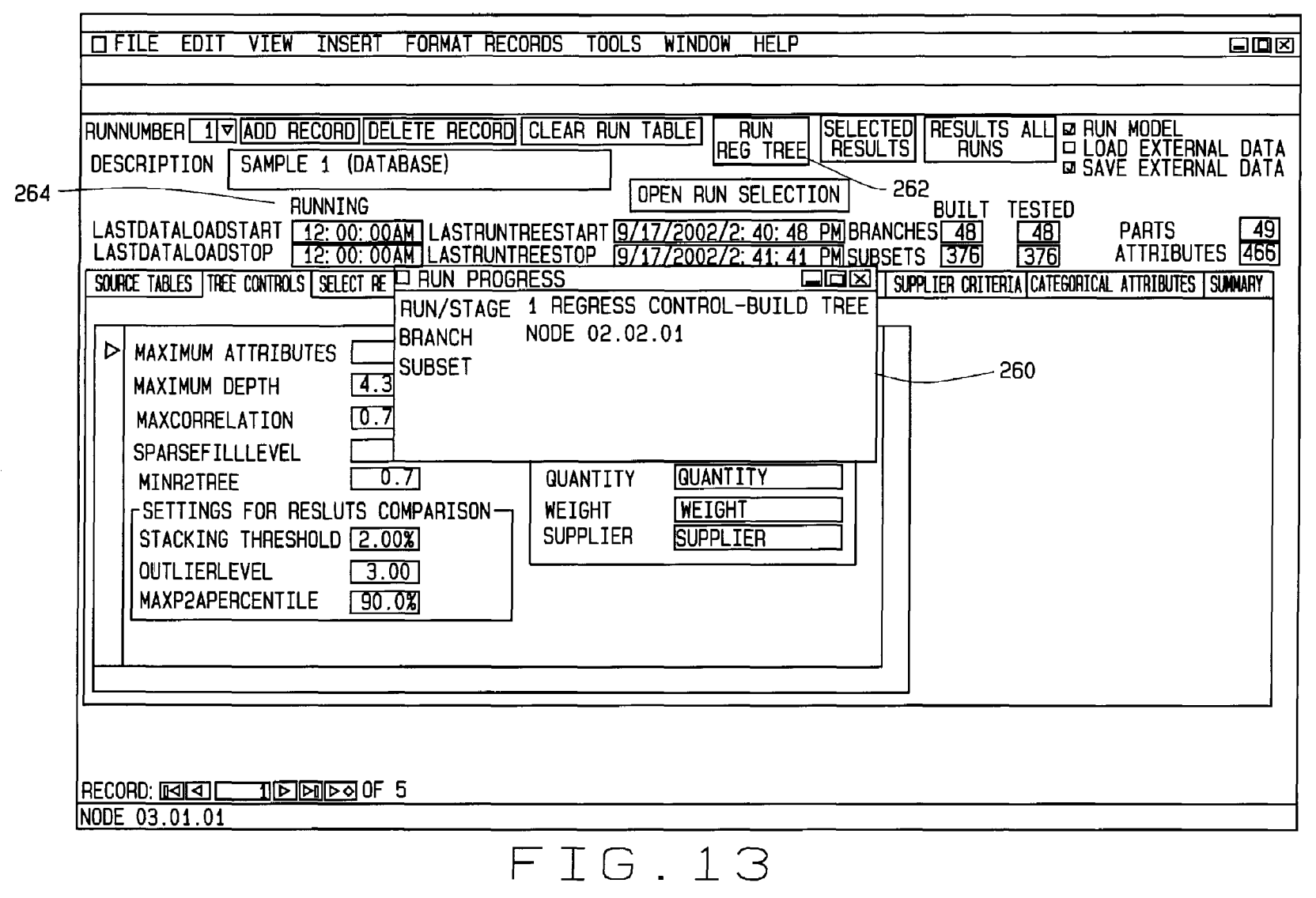
Figure 14:
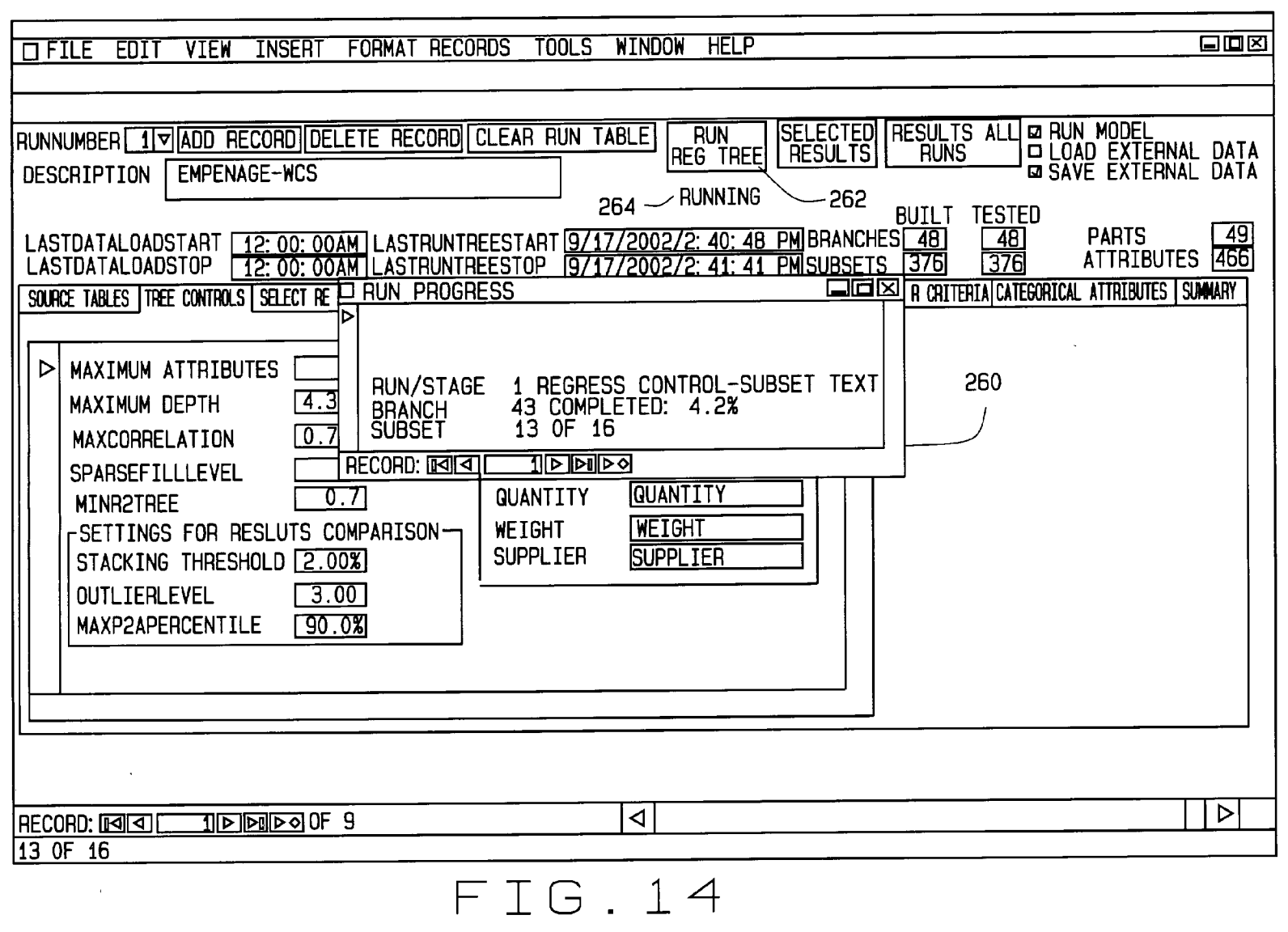

FIGS. 13 and 14 are illustrations of a Run Progress dialog box 260 that may be displayed on display 24 after the Run button 262 has been activated and the regression analysis tree program 18 is being executed by the system 10. As shown, the Run Progress dialog box 260 may provide information as to the Run/Stage, the Branch and/or the subset being tested. In addition, the panel layout 202 may also include an indication as to whether the regression analysis tree program 18 is running 264 or complete 266 (FIG. 7).

Figure 15:
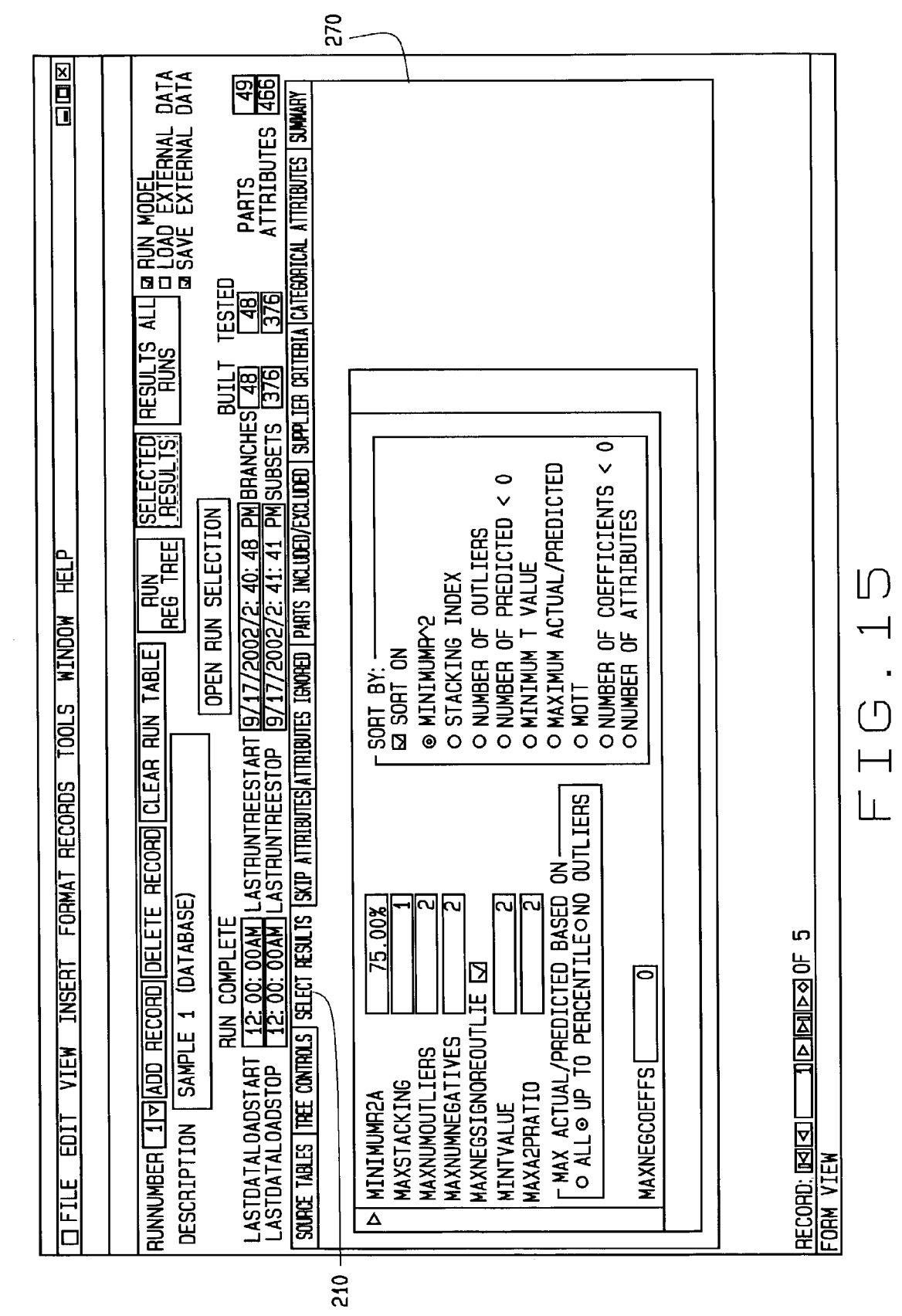

FIG. 15 is an illustration of the Select Results panel 270 that may be displayed on display 24 after the Select Results tab 210 has been selected. Generally, the Select Result panel 270 allows the user to set report filters and/or set the sort order (i.e., ascending or descending) for viewing the filtered report(s) at operation 82 (FIG. 2). As shown in FIG. 15, the Select Result panel 270 allows the user to enter the following selection criteria: minimum adjusted $R^2$, maximum stacking, maximum number of outliers, maximum number of negative predicted values, whether to ignore outliers or not in counting negative predicted values, minimum acceptable student's t-statistic in an attribute coefficient (ignoring the intercept), maximum allowable Predicted to Actual (or Actual to Predicted) ratio for all parts considered, for parts excluding outliers, or for parts including up to the $90^{th}$ percentile (or other level set by the modeler); and the maximum number of negative coefficients (ignoring the intercept).

The Select Results panel 270 also allows the user to choose sort order for the results in compliance with the selection criteria. As shown, the user may choose to have the results sorted according to minimum adjusted $R^2$, stacking index, number of outliers, number of negative predicted values, minimum t-value, maximum Actual to Predicted ratio, MOTT, number of negative coefficients, and number of attributes.

Figure 16:
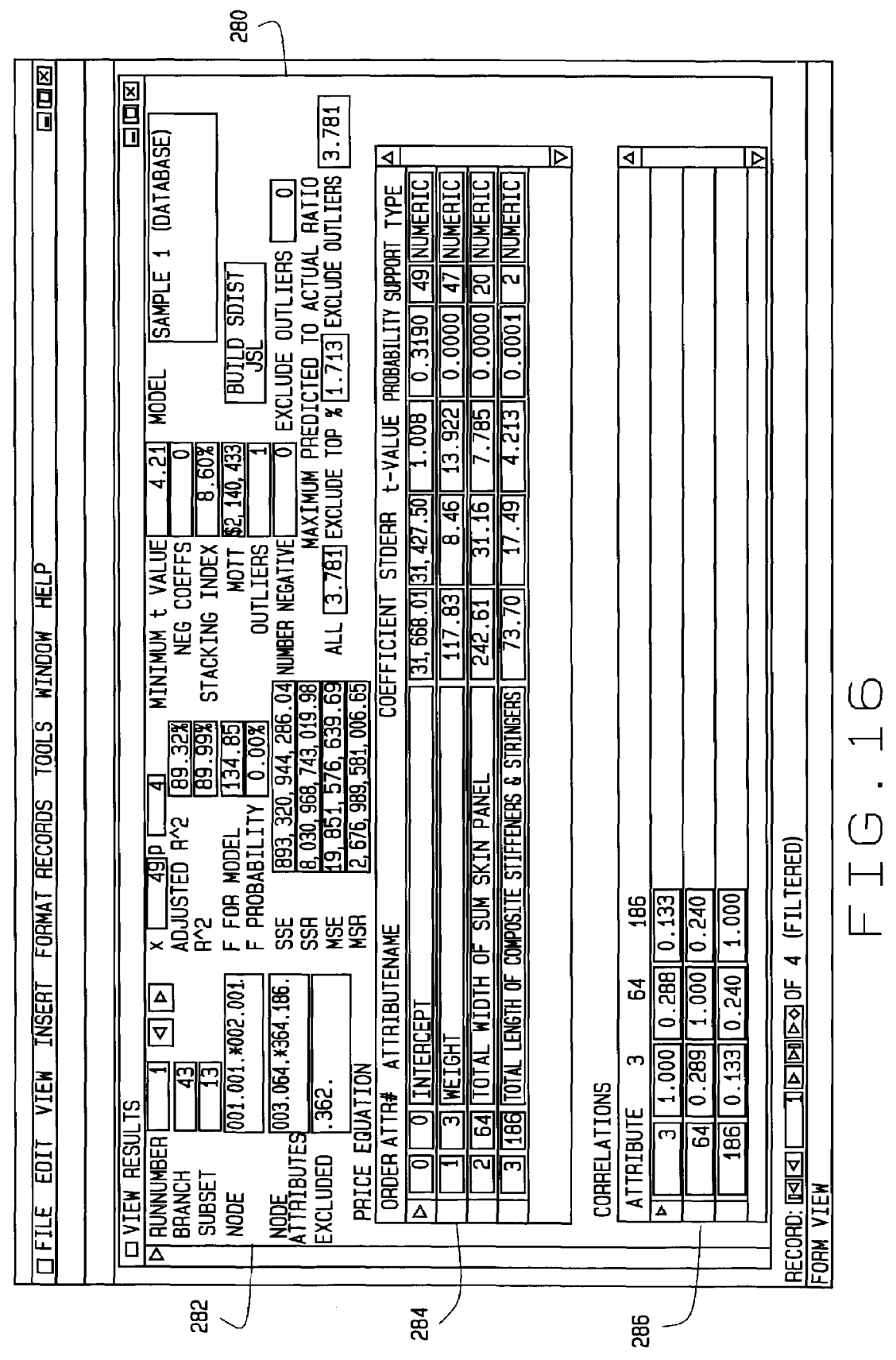

FIG. 16 is an illustration of the View Results panel 280 that may be displayed on display 24 after the user has finished entering data into the Select Results panel 270. Generally, the View Results panel 280 displays for a single candidate model the following three (3) sets of information: model level information 282, the equation or model summary 284, and the correlation matrix 286.

Accordingly, the present invention improves several aspects of the parametric modeling process including model development, model updating after attribute data changes, model evaluation, model documentation, model reporting, and model reliability.

Although regression analysis is well known, traditional methods of constructing regression formulas are time consuming and may also produce unusable results. By optimizing the parametric modeling process through control and automation as described above, however, the present invention substantially reduces the cycle time for developing parametric models. Such time reductions are especially significant for complex statements of work, such as assembly models which commonly include hundreds of attributes. The time savings afforded by the present invention allow the modeler to be released earlier and move on to other related or unrelated tasks.

By logging or saving each of the candidate models tested, the present invention substantially improves documentation and recovery following changes to attribute data. The present invention allows for faster model updating in response to data changes and permits extensively documented and organized modeling activities for complex statements of work in which hundreds of attributes are common.

The query and reporting facility of the present invention allows regression results to be ranked, sorted, and selected for further use, such as exporting to other modeling tools. Accordingly, the present invention allows regression results to be evaluated in a more meaningful and efficient manner than that allowed by known modeling tools recognized in the art. The present invention also allows for the evaluation of numerous regression results across a collection of regressions and is sufficiently adaptable for use in conjunction with other modeling tools.

It is anticipated that the invention will be applicable to any of a wide range of parametric modeling problems including modeling situations with large numbers of attributes. Accordingly, the specific references to parametric price modeling should not be construed as limiting the scope of the present invention, as the invention could be applied in any parametric modeling implementation.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A method for enabling optimization of a parametric modeling process, the method comprising:
   receiving a plurality of attributes;
   allowing at least one user input;
   building a tree in accordance with the at least one user input by using a modified forward stepwise regression process to select at least one attribute from the plurality of attributes; and
   performing regression analysis to calculate at least one regression result for an attribute subset in a tree branch when the tree branch is in compliance with at least one criterion and the attribute subset has not been previously analyzed.

2. The method of claim 1, wherein allowing at least one user input comprises allowing a user to set at least one tree control.

3. The method of claim 2, wherein the at least one tree control comprises:
   a limit on the number of levels of the tree; and
   a limit on the number of nodes for each tree level.

4. The method of claim 3, wherein the limit on the number of nodes for each tree level varies by tree level such that each tree level is not limited to the same number of nodes.

5. The method of claim 1, wherein allowing at least one user input comprises allowing a user to define a data source, the data source including the plurality of attributes.

6. The method of claim 1, wherein allowing at least one user input comprises allowing a user to designate at least one suppressed attribute, the at least one suppressed attribute not being available for inclusion within the tree.

7. The method of claim 1, wherein allowing at least one user input comprises allowing a user to designate at least one suppressed part, the at least one suppressed part not being available for inclusion within the tree.

8. The method of claim 1, wherein allowing at least one user input comprises allowing a user to designate at least one selection criterion for selecting the regression results to be outputted to the user.

9. The method of claim 1, wherein allowing at least one user input comprises allowing a user to designate a sort order for outputting the regression results to the user.

10. The method of claim 1, wherein allowing at least one user input comprises allowing a user to extend regression results to another modeling tool.

11. The method of claim 1, wherein the tree building comprises filtering the plurality of attributes to determine available attributes for inclusion within the tree.

12. The method of claim 11, wherein filtering the plurality of attributes comprises:
removing duplicate attributes from the plurality of attributes;
removing poorly supported attributes from the plurality of attributes;
removing constant attributes from the plurality of attributes; and
removing attributes designated to be suppressed from the plurality of attributes.

13. The method of claim 11, wherein the tree building comprises:
calculating single variable regression formulas for each available attribute; and
using the single variable regression formulas to select at least one attribute for a first level of the tree.

14. The method of claim 13, wherein:
calculating single variable regression formulas for each available attribute comprises calculating an objective function for each available attribute; and
the attributes selected for inclusion within the first tree level have the highest objective function results.

15. The method of claim 14, wherein:
calculating an objective function for each available attribute comprises calculating an F-score for each available attribute; and
the attributes selected for inclusion within the first tree level have the highest F-scores.

16. The method of claim 13, wherein the tree building, for each tree level subsequent to the first tree level, comprises:
determining attribute candidates for a given node by:
removing from the available attributes each attribute previously selected for nodes on tree levels preceding the given node's tree level; and
removing from the available attributes each attribute not in compliance with at least one criterion;
calculating regression formulas for each attribute candidate for the given node; and
using the regression formulas to select an attribute from the attribute candidates for the given node.

17. The method of claim 16, wherein:
calculating regression formulas for each attribute candidate for the given node comprises calculating an objective function for each attribute candidate; and
using the regression formulas to select an attribute from the attribute candidates for the given node comprises selecting the attribute candidate having the highest objective function result.

18. The method of claim 17, wherein:
calculating an objective function for each attribute comprises calculating an F-score for each attribute; and
selecting the attribute candidate having the highest objective function result comprises selecting the attribute candidate having the highest F-score.

19. The method of claim 16, wherein removing from the available attributes each attribute not in compliance with at least one criterion comprises removing from the available attributes each attribute having a correlation with an attribute previously selected in the given node's branch higher than a threshold value.

20. The method of claim 1, wherein the at least one criterion comprises a minimum coefficient of multiple determination threshold value.

21. The method of claim 1, further comprising performing additional regression analysis on the attribute subset when the attribute subset is in compliance with at least one criterion.

22. The method of claim 1, wherein performing additional regression analysis on the attribute subset comprises calculating a maximum predicted to actual ratio.

23. The method of claim 1, wherein performing additional regression analysis on the attribute subset comprises calculating a stacking index.

24. The method of claim 1, further comprising logging the regression results.

25. The method of claim 1, further comprising using at least one regression formula of the tree to predict a price for a negotiation.

26. A system for enabling optimization of a parametric modeling process, the system comprising:
a processor;
an interface for allowing at least one user input; and
a regression analysis tree program executable by the processor, the regression analysis tree program operating to:
build a tree in accordance with the at least one user input by using a modified forward stepwise regression process to select at least one attribute from the plurality of attributes; and
perform regression analysis to calculate at least one regression result for an attribute subset in a tree branch when the tree branch is in compliance with at least one criterion and the attribute subset has not been previously analyzed.

27. The system of claim 26, further comprising a query and reporting facility for filtering, selecting, ranking, and sorting the regression results.

28. The system of claim 26, wherein the interface comprises an interactive screen.

29. Apparatus for enabling optimization of a parametric modeling process, the apparatus comprising:
a module for implementing an interface, the interface allowing at least one user input;
a module for receiving a plurality of attributes;
a module for building a tree in accordance with the at least one user input by using a modified forward stepwise regression process to select at least one attribute from the plurality of attributes; and
a module for performing regression analysis to calculate at least one regression result for an attribute subset in a tree branch when the tree branch is in compliance with at least one criterion and the attribute subset has not been previously analyzed.

30. The apparatus of claim 29, wherein the interface comprises at least one interactive screen.

31. The apparatus of claim 29, further comprising a module for implementing a query and reporting facility, the query and reporting facility filtering, selecting, ranking, and sorting the regression results.

* * * * *